United States Patent [19]

Campbell, Jr. et al.

[11] Patent Number: 5,302,952
[45] Date of Patent: Apr. 12, 1994

[54] AUTOMATIC A/D CONVERTER OPERATION WITH PAUSE CAPABILITY

[75] Inventors: Jules D. Campbell, Jr.; Carl D. Wiseman; William D. Huston; Colleen M. Collins; Mark R. Heene, all of Austin, Tex.

[73] Assignee: Motorola, Inc., Schaumburg, Ill.

[21] Appl. No.: 936,492

[22] Filed: Aug. 28, 1992

[51] Int. Cl.⁵ .......................................... H03M 1/12
[52] U.S. Cl. ................................... 341/155; 341/122
[58] Field of Search ............... 341/155, 122, 123, 124, 341/125, 110

[56] References Cited

U.S. PATENT DOCUMENTS

| | | | |
|---|---|---|---|
| 3,821,696 | 6/1974 | Harrell et al. | 340/18 LD |
| 4,264,898 | 4/1981 | Barman et al. | 340/347 NT |
| 4,338,665 | 7/1982 | Aono et al. | 364/424 |
| 4,381,498 | 4/1983 | Goodale | 340/347 |
| 4,404,545 | 9/1983 | Nakanishi et al. | 340/347 |
| 4,618,848 | 10/1986 | Parfitt | 340/347 |
| 4,654,632 | 3/1987 | Yoshida et al. | 340/347 AD |
| 4,677,422 | 6/1987 | Naito | 340/347 SH |
| 4,816,996 | 3/1989 | Hill et al. | 364/200 |
| 4,933,676 | 6/1990 | Hauge et al. | 341/141 |
| 4,937,575 | 6/1990 | Kummer | 341/118 |
| 4,958,277 | 9/1990 | Hill et al. | 364/200 |
| 5,081,454 | 1/1992 | Campbell et al. | 341/141 |
| 5,166,685 | 11/1992 | Campbell et al. | 341/141 |
| 5,168,276 | 12/1992 | Huston et al. | 341/141 |

FOREIGN PATENT DOCUMENTS

| | | | |
|---|---|---|---|
| 0117132A2 | 8/1984 | European Pat. Off. | H03K 13/20 |
| 0350932A3 | 1/1990 | European Pat. Off. | G06F 3/05 |
| 0372526A2 | 6/1990 | European Pat. Off. | H03M 1/12 |
| WO87/03114 | 5/1987 | United Kingdom | G06F 3/05 |

OTHER PUBLICATIONS

"Analog to Digital Conversion Handbook", Analog Devices, 1986, pp. 87, 271 and 272.
Texas Instruments, Incorporated; Post Office Box 5012; Dallas, Texas; 75222, The TTL Data Book for Design Engineers–Second Edition; 1981; pp. 7-190 through 7-195.

Primary Examiner—Brian K. Young
Attorney, Agent, or Firm—Susan C. Hill

[57] ABSTRACT

An analog-to-digital conversion module, QADC (1), and method minimize software involvement by providing a pause capability. Each queue in the QADC (1) has one or more Conversion Command Words, CCWs (82), in a Conversion Command Word Table (62). Each conversion command word, CCW (82), has a Pause bit which can be used to create multiple sub-queues of A/D conversions without requiring the use of interrupts. The Pause bit can be used to place a queue in a pause state. When a queue enters a pause state, the scanning of CCWs (82) is stopped. The queue must then receive a trigger in order for the scanning of CCWs (82) to continue again.

27 Claims, 13 Drawing Sheets

| SIGNAL NAME | MNEMONIC | QADC INPUT OR OUTPUT |
|---|---|---|
| SYSTEM CLOCK | ICLOCK | INPUT FROM IMB |
| MASTER RESET | IMSTRSTB | INPUT FROM IMB |
| SYSTEM RESET | ISYSRSTB | INPUT FROM IMB |
| FREEZE | IFREEZEB | INPUT FROM IMB |
| TEST | ITSTMODB | INPUT FROM IMB |
| TEST LINE ENABLE | IMBTSTB | INPUT FROM IMB |
| INTERNAL PERIPHERAL SELECT | IIPCSB | INPUT FROM IMB |
| MODULE MAPPING | IMODMAP | INPUT FROM IMB |
| FUNCTION CODES | IFC[2:0] | INPUT FROM IMB |
| CYCLE START | ICYSB | INPUT FROM IMB |
| WRITE | IWRITEB | INPUT FROM IMB |
| ADDRESS BUS | IADDR[23:0] | INPUT FROM IMB |
| ADDRESS STROBE | IASB | INPUT FROM IMB |
| ADDRESS ACKNOWLEDGE | IAACKB | OUTPUT TO IMB |
| SIZE | ISIZ[1:0] | INPUT FROM IMB |
| DATA BUS | IDATA[15:0] | INPUT/OUTPUT FROM/TO IMB |
| DATA STROBE | IDSB | INPUT FROM IMB |
| DATA TRANSFER ACKNOWLEDGE | IDTACKB | OUTPUT TO IMB |
| BUS ERROR | IBERRB | OUTPUT TO IMB |
| INTERRUPT REQUEST LEVEL | IRQ[7:1] | OUTPUT TO IMB |
| INTERRUPT ARBITRATION | IARB[1:0] | INPUT/OUTPUT FROM/TO IMB |

*FIG. 4*

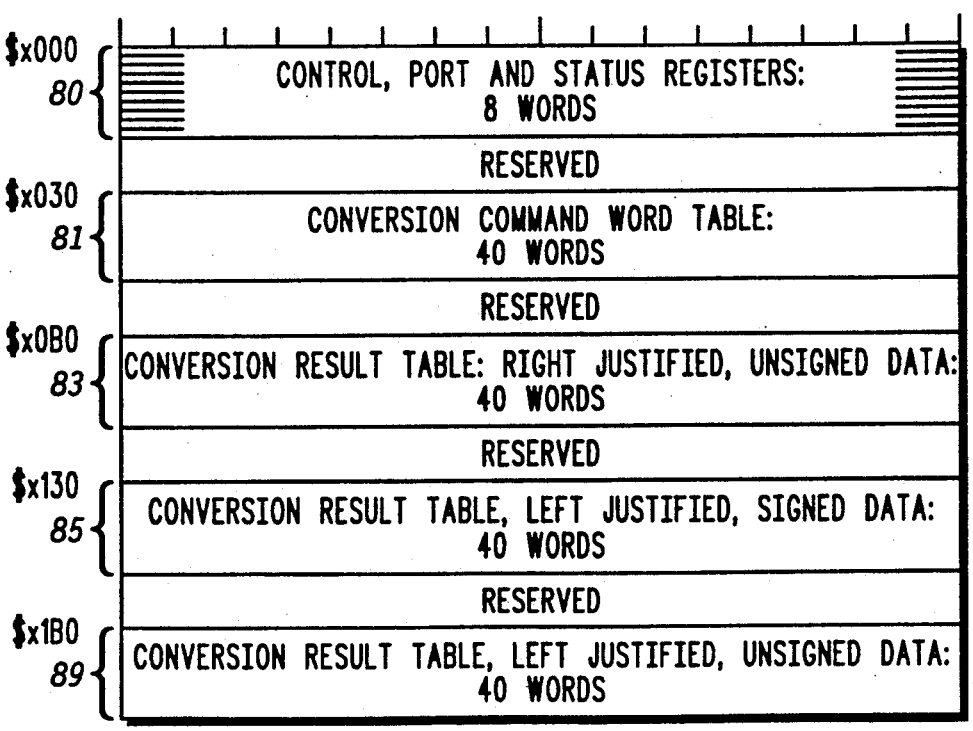

*FIG. 5*

| Address | 15 | 14 | 13 | 12 | 11 | 10 | 9 | 8 | 7 | 6 | 5 | 4 | 3 | 2 | 1 | 0 | Register |
|---|---|---|---|---|---|---|---|---|---|---|---|---|---|---|---|---|---|
| $x000 | STOP | FRZ | — | — | IARB | MODULE CONFIG. REGISTER |
| $x002 | — | TEST MODE | TEST DATA | TEST REGISTER |
| $x004 | — | IRL1 | — | IRL2 | IVB | — | INTERRUPT REGISTER |
| $x006 | PD | PORT DATA DIRECTION REGISTER |
| $x008 | DD | — | PORT DATA REGISTER |
| $x00A | CIE1 | PIE1 | ST1 | — | MQ1 | — | MUX | PRS | CONTROL REGISTER 1 |
| $x00C | CIE2 | PIE2 | ST2 | MQ2 | RES | — | BQ2 | CONTROL REGISTER 2 |
| $x00E | CF1 | PF1 | CF2 | PF2 | TOR1 | TOR2 | QS | CWP | STATUS REGISTER |
| $x010 | RESERVED 16 WORDS |
| $x02E | |

| 15 | | | 8 | 7 | | 0 |
|---|---|---|---|---|---|---|
| — | | PAUSE | IST | CHAN | | |

82

CONVERSION COMMAND WORD

FIG. 10

NUMBER OF INTERNALLY + EXTERNALLY MUXED ANALOG CHANNELS

| NUMBER OF EXTERNAL MUX CHIPS | 12 PINS AVAILABLE TO QADC | 16 PINS AVAILABLE TO QADC | 20 PINS AVAILABLE TO QADC | 25 PINS AVAILABLE TO QADC |
|---|---|---|---|---|
| 0 | 8 | 12 | 16 | 16 |
| 1 | 4 + 8 = 12 | 8 + 8 = 16 | 12 + 8 = 20 | 15 + 8 = 23 |
| 2 | 3 + 16 = 19 | 7 + 16 = 23 | 11 + 16 = 27 | 14 + 16 = 30 |
| 3 | 2 + 24 = 26 | 6 + 24 = 30 | 10 + 24 = 34 | 13 + 24 = 37 |
| 4 | 1 + 32 = 33 | 5 + 32 = 37 | 9 + 32 = 41 | 12 + 32 = 44 |

NON-EXTERNALLY MULTIPLEXED CHANNEL ASSIGNMENTS AND PIN DESIGNATIONS

| PIN NAME | PIN TYPE | CHANNEL NUMBER | NON-MUXED CHANNEL/FUNCTION (MUX = 0) |
|---|---|---|---|
| QAB0 | I | 000000 | AN0 |
| QAB1 | I | 000001 | AN1 |
| QAB2 | I | 000010 | AN2 |
| QAB3 | I | 000011 | AN3 |
| QAB4 | I | 110000 | AN48 |
| QAB5 | I | 110001 | AN49 |
| QAB6 | I | 110010 | AN50 |
| QAB7 | I | 110011 | AN51 |
| QAA0 | I/O | 110100 | AN52 |
| QAA1 | I/O | 110101 | AN53 |
| QAA2 | I/O | 110110 | AN54 |
| QAA3 | I/O | 110111 | AN55/ETRIG1 |
| QAA4 | I/O | 111000 | AN56/ETRIG2 |
| QAA5 | I/O | 111001 | AN57 |
| QAA6 | I/O | 111010 | AN58 |
| QAA7 | I/O | 111011 | AN59 |
| $V_{RL}$ | I | 111100 | LOW REFERENCE |
| $V_{RH}$ | I | 111101 | HIGH REFERENCE |
| – | – | 111110 | $(V_{RH}-V_{RL})\div 2$ |
| – | – | 111111 | END OF QUEUE CODE |

EXTERNALLY MULTIPLEXED CHANNEL ASSIGNMENTS AND PIN DESIGNATIONS

| PIN NAME | PIN TYPE | CHANNEL NUMBER | MUXED CHANNEL/FUNCTION (MUX = 1) |
|---|---|---|---|
| QAB0 | I | 00xxx0 | ANw (EVEN CHANNELS 0–14) |
| QAB1 | I | 00xxx1 | ANx (ODD CHANNELS 1–15) |
| QAB2 | I | 01xxx0 | ANy (EVEN CHANNELS 16–30) |
| QAB3 | I | 01xxx1 | ANz (ODD CHANNELS 17–31) |
| QAB4 | I | 110000 | AN48 |
| QAB5 | I | 110010 | AN49 |
| QAB6 | I | 110010 | AN50 |
| QAB7 | I | 110011 | AN51 |
| QAA0 | I/O | 110100 | MA0 |
| QAA1 | I/O | 110101 | MA1 |
| QAA2 | I/O | 110110 | MA2 |
| QAA3 | I/O | 110111 | AN55/ETRIG1 |
| QAA4 | I/O | 111000 | AN56/ETRIG2 |
| QAA5 | I/O | 111001 | AN57 |
| QAA6 | I/O | 111010 | AN58 |
| QAA7 | I/O | 111011 | AN59 |
| $V_{RL}$ | I | 111100 | LOW REFERENCE |
| $V_{RH}$ | I | 111101 | HIGH REFERENCE |
| – | – | 111110 | $(V_{RH}-V_{RL})\div 2$ |
| – | – | 111111 | END OF QUEUE CODE |

*FIG. 9*

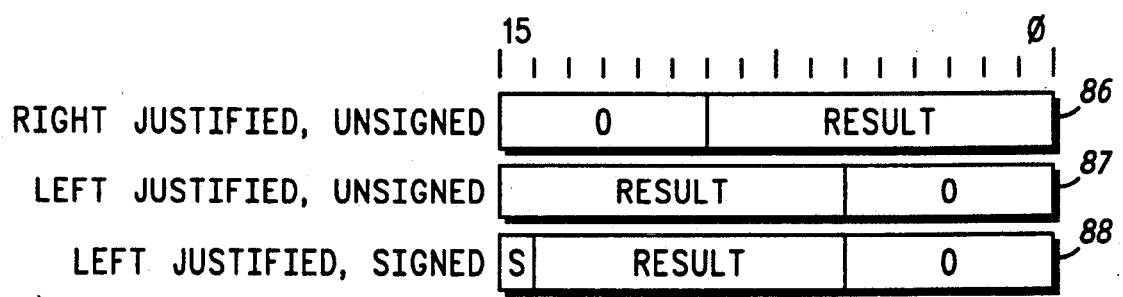
FIG. 11
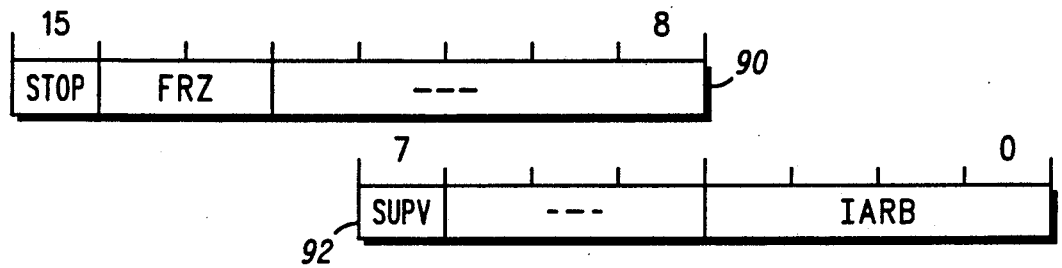
FIG. 12
FIG. 13
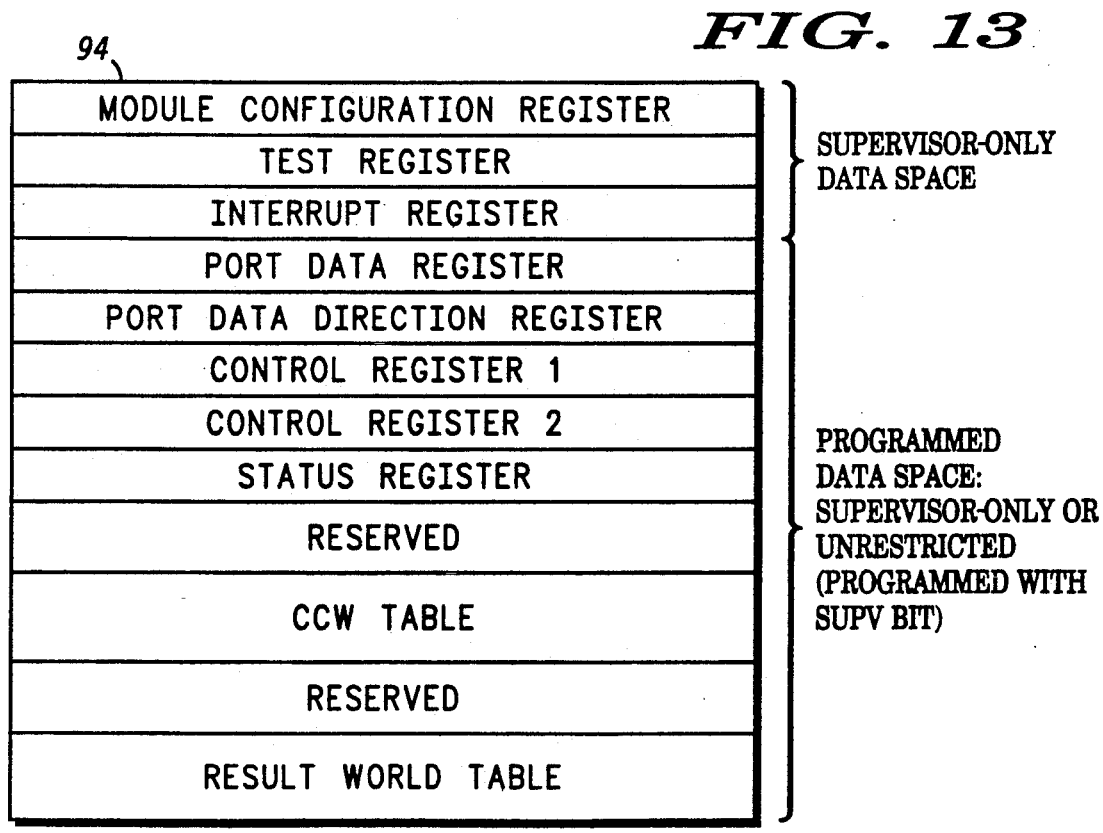

|  | | OFFSET FROM BASE ADDRESS | REGISTER NAME | |
|---|---|---|---|---|
| | RSLT0 | $x0B0 | QADC RESULT REG 0 (RSLT0) | RIGHT JUSTIFIED UNSIGNED |
| | RSLT1 | $x0B2 | QADC RESULT REG 1 (RSLT1) | |
| | RSLT2 | | QADC RESULT REG 2 (RSLT2) | |
| | RSLT3 | | QADC RESULT REG 3 (RSLT3) | |
| | RSLT4 | | QADC RESULT REG 4 (RSLT4) | |
| | RSLT5 | | QADC RESULT REG 5 (RSLT5) | |
| | RSLT6 | | QADC RESULT REG 6 (RSLT6) | |
| | RSLT7 | | QADC RESULT REG 7 (RSLT7) | |
| | RSLT39 | $x0FE | QADC RESULT REG 39 (RSLT39) | |
| RSLT0 | | $x130 | QADC RESULT REG 0 (RSLT0) | LEFT JUSTIFIED SIGNED |
| RSLT1 | | $x132 | QADC RESULT REG 1 (RSLT1) | |
| RSLT2 | | | QADC RESULT REG 2 (RSLT2) | |
| RSLT3 | | | QADC RESULT REG 3 (RSLT3) | |
| RSLT4 | | | QADC RESULT REG 4 (RSLT4) | |
| RSLT5 | | | QADC RESULT REG 5 (RSLT5) | |
| RSLT6 | | | QADC RESULT REG 6 (RSLT6) | |
| RSLT7 | | | QADC RESULT REG 7 (RSLT7) | |
| RSLT39 | | $x17E | QADC RESULT REG 39 (RSLT39) | |
| RSLT0 | | $x1B0 | QADC RESULT REG 0 (RSLT0) | LEFT JUSTIFIED UNSIGNED |
| RSLT1 | | $x1B2 | QADC RESULT REG 1 (RSLT1) | |
| RSLT2 | | | QADC RESULT REG 2 (RSLT2) | |
| RSLT3 | | | QADC RESULT REG 3 (RSLT3) | |
| RSLT4 | | | QADC RESULT REG 4 (RSLT4) | |
| RSLT5 | | | QADC RESULT REG 5 (RSLT5) | |
| RSLT6 | | | QADC RESULT REG 6 (RSLT6) | |
| RSLT7 | | | QADC RESULT REG 7 (RSLT7) | |
| RSLT39 | | $x1FE | QADC RESULT REG 39 (RSLT39) | |

*FIG. 21*

AUTOMATIC A/D CONVERTER OPERATION WITH PAUSE CAPABILITY

REFERENCE TO RELATD APPLICATIONS

The present application is related to the following U.S. patent applications:

1. U.S. Pat. No. 5,166,685, titled "Automatic Selection of External Multiplexer Channels By An A/D Converter Integrated Circuit", filed Mar. 12, 1992, and invented by by Jules D. Campbell, Jr. et al.;
2. U.S. Pat. No. 5,168,276, titled "Automatic A/D Converter Operation Using A Programmable Control Table", filed Mar. 16, 1992, and invented by William D. Huston et al;
3. U.S. Pat. No. 5,081,454, titled "Automatic A/D Converter Operation Using Programmable Sample Time", filed Sep. 4, 1990, and invented by Jules D. Campbell, Jr. et al.; and
4. "Automatic A/D Converter Operation With Selectable Result Format", filed Sep. 4, 1990, invented by Jules D. Campbell, Jr. et al., and having Ser. No. 07/577,247.

TECHNICAL FIELD OF THE INVENTION

This invention relates generally to analog-to-digital converters, and, more particularly, to an A/D converter system having pause capability and a method of using same.

BACKGROUND INFORMATION

The present invention has utility in applications requiring the conversion of an analog signal into a digital signal, for example, for computer sensing of analog information in an automotive control system. To further illustrate, in an automotive engine control system, a microcomputer requires analog signal information from various sensing devices which must be converted into digital signal information before it can be processed by the microcomputer. Examples of such analog signal information are the outputs of sensors for manifold pressure, oxygen, rotational speed, operator input, battery voltage, etc.

In a typical automotive application, many different analog signals need to be converted. Some analog signals need to be measured frequently, such as rotational speed, and other analog signals must only be measured occasionally. Still other analog signals need to be measured only when a defect or error condition has been detected within the automotive system. In addition, some analog signals which are part of the same automotive system, such as the anti-lock braking system, must be measured at points very close together in time.

Prior art microcomputers used a software program, executed by the central processing unit, in order to determine which analog signals were to be converted by an A/D (analog to digital) converter. The A/D conversions which were required to be measured at points close together in time were generally placed in the same software subroutine. It was usually necessary to place an upper limit on the maximum interrupt latency of the system. A maximum interrupt latency ensured that the conversions within the same subroutine all occurred within a known maximum period of time. However, as automative systems increased in complexity, the need for more conversions in a subroutine required an increase in the maximum interrupt latency; while the need to take measurements closer together in time required a decrease in the maximum interrupt latency.

Thus there is a significant need to provide an A/D converter system in which interrupt latency is not a limiting factor.

BRIEF SUMMARY OF THE INVENTION

The previously mentioned needs are fulfilled and other advantages achieved with the present invention. In one form, the present invention is a method and apparatus for automatic A/D converter operation with pause capability.

In one embodiment, the apparatus has at least one analog input terminal and has logic for reading a first conversion command word. The apparatus also has sampling logic which is responsive to the first conversion command word for sampling an analog signal on the analog input terminal and for providing a sampled value of the analog signal. The apparatus additionally has an analog-to-digital converter which is coupled to the sampling logic. The analog-to-digital converter converts the sampled value of the analog signal into a digital value. Also, the apparatus has logic for entering a pause state. This logic for entering a pause state is coupled to the logic for reading.

The present invention will be understood by one skilled in the art from the detailed description below in conjunction with the accompanying drawings.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 4 defines the Intermodule Bus (IMB) signals of the A/D converter module of the present invention.

FIG. 5 shows an address map for the control registers, Conversion Command Word table, and the Conversion Result Table of the A/D converter module.

FIG. 6 is a more detailed address map showing the formats of the Control, Port, and Status Registers 80 shown in FIG. 5.

FIG. 7 shows the format of a Conversion Command Word (CCW) of the A/D converter module.

FIG. 9 is a table illustrating how the CCW CHAN bits specify which input pin is converted when the channels are externally multiplexed and when the channels are not externally multiplexed.

FIG. 10 is a table illustrating the number of analog channels available with different numbers of external multiplexer IC's, in terms of the number of I/O pins allocated to the A/D converter module.

FIG. 11 illustrates the data format options of Result Words stored in the Conversion Result Table.

FIG. 12 shows the format of the Module Configuration Register of the A/D converter module.

FIG. 13 illustrates the use of the SUPV bit of the Module Configuration Register of the A/D converter module.

FIG. 21 illustrates the addresses required to read Result Words stored in the Conversion Result Table in at least three different data format options.

DESCRIPTION OF PREFERRED EMBODIMENT

Overview

The present invention provides an A/D converter system in which the user of the microcomputer is free, using the Pause bit, to define multiple sub-queues of A/D conversions within one or more queues. The present invention allows the user to define multiple sub-queues of A/D conversions without requiring software intervention, such as the use of interrupts. Thus the amount of system time spent processing interrupts may be reduced. In addition, interrupt latency may no longer be a limiting factor for the A/D converter system.

The terms "assert" and "negate" will be used when referring to the rendering of a signal, status bit, or similar apparatus into its logically true or logically false state, respectively. The term "set" will be used when referring to the rendering of a signal, status bit, or similar apparatus into a logic one state. The term "clear" will be used when referring to the rendering of a signal, status bit, or similar apparatus into a logic zero state. Note that in one embodiment of the present invention, the asserted state of a signal, status bit, or similar apparatus may be defined as a logic one state. And in an alternate embodiment, the asserted state of that same signal, status bit, or similar apparatus may be defined as a logic zero state.

The symbol "%" preceding a number indicates that the number is represented in its binary or base two form. The symbol "$" preceding a number indicates that the number is represented in its hexadecimal or base sixteen form.

Figure 1:
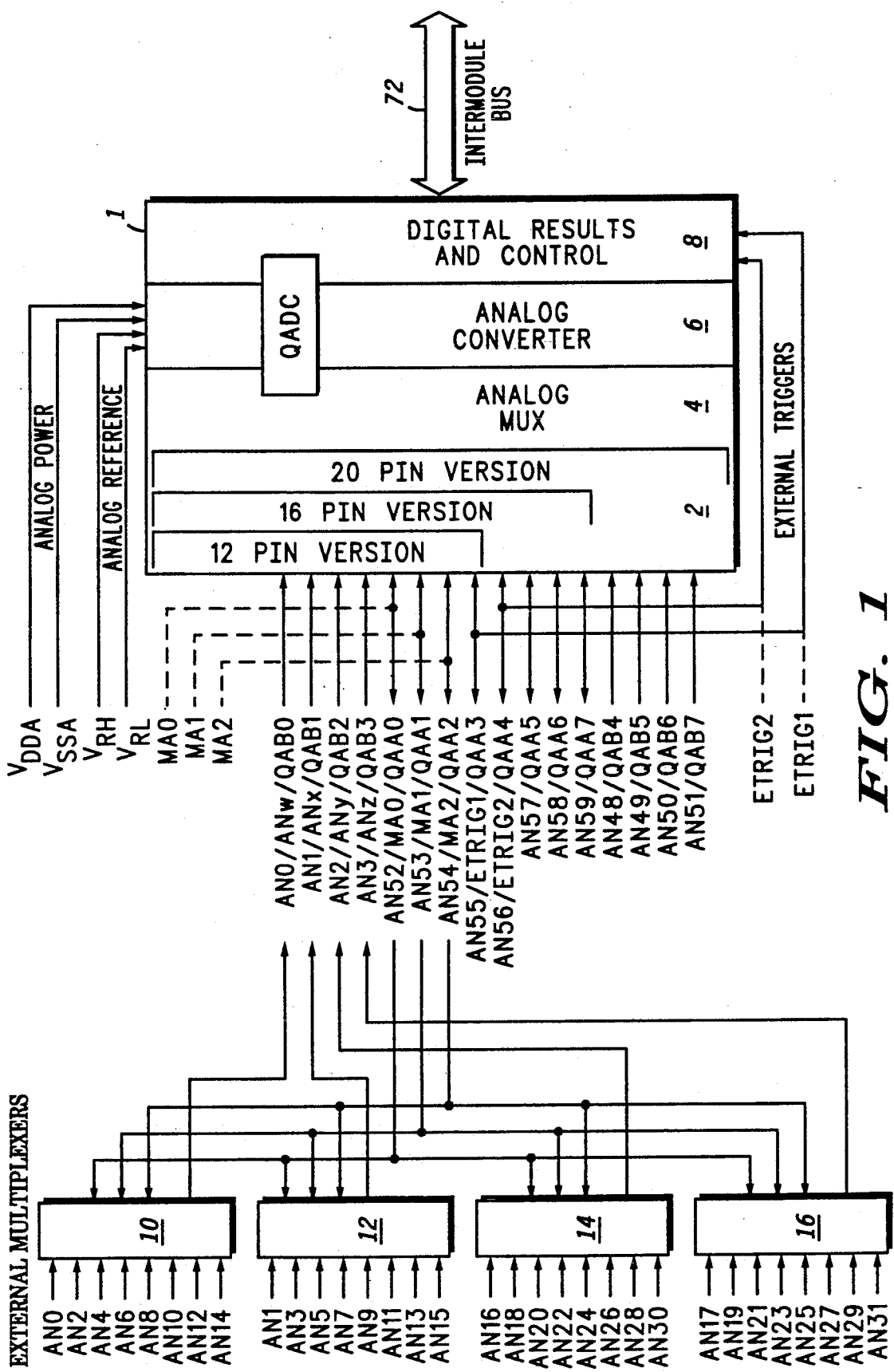
FIG. 1 shows an A/D converter system, having an A/D converter module and one or more multiplexer integrated circuits, in accordance with one embodiment of the present invention.

FIG. 1 shows an A/D converter system, comprising an A/D converter integrated circuit (IC) and one or more multiplexer integrated circuits. A Queued A/D Converter module (QADC) 1 is shown coupled to one or more external multiplexers (MUXs) 10, 12, 14 and 16. In a preferred embodiment QADC 1 and the external MUXs are implemented as integrated circuits. External multiplexers are commercially available from Motorola, Inc., for example, as part numbers MC14051 or MC74HC4051.

The Queued A/D Converter module (QADC) 1 is described herein as "queued", because, as will be described in greater detail below, it operates in response to one or more queues of Conversion Command Words.

QADC 1 comprises a plurality of I/O pins, shown generally by reference numeral 2, an analog MUX portion 4, an analog converter portion 6, and a portion for performing control and storing digital results 8.

The I/O pin configurations of QADC 1 vary from a 12-pin version to a 25-pin version. Also coupled to appropriate pins of QADC 1 are power supplies $V_{SSA}$ and $V_{DDA}$, references $V_{RH}$ and $V_{RL}$, and external triggers ETRIG1 and ETRIG2. In some versions, the external triggers ETRIG1 and ETRIG2 are dedicated pins.

Eight of the I/O pins of QADC 1 function as Port A I/O pins and are labeled QAA0–QAA7, while eight others function as Port B input pins and are labeled QAB0–QAB7. The prefix "QAA" designates Port A, and the prefix "QAB" designates Port B.

The external MUXs 10, 12, 14, and 16 are shown comprising eight analog input channels each. For example, MUX 14 has analog input channels AN16, AN18, AN20, AN22, AN24, AN26, AN28, and AN30.

The external MUXs are addressed via address lines MA0–MA2. The prefix "MA" designages Multiplexed Address. In some versions, the address lines MA0–MA2 are dedicated pins. The outputs of MUXs 10, 12, 14, and 16 are coupled to lines ANw, ANx, ANy, and ANz, respectively. The prefix "AN" designates Analog Input.

As will be discussed further below, many of the I/O pins 2 are programmable to perform multiple functions.

As will be shown and described below, QADC 1 automatically reads analog signals being input into MUXs 10, 12, 14, and 16 and converts the analog values into digital values which are stored in the digital results portion 8 of QADC 1.

Queued A/D Converter Module

Figure 2:
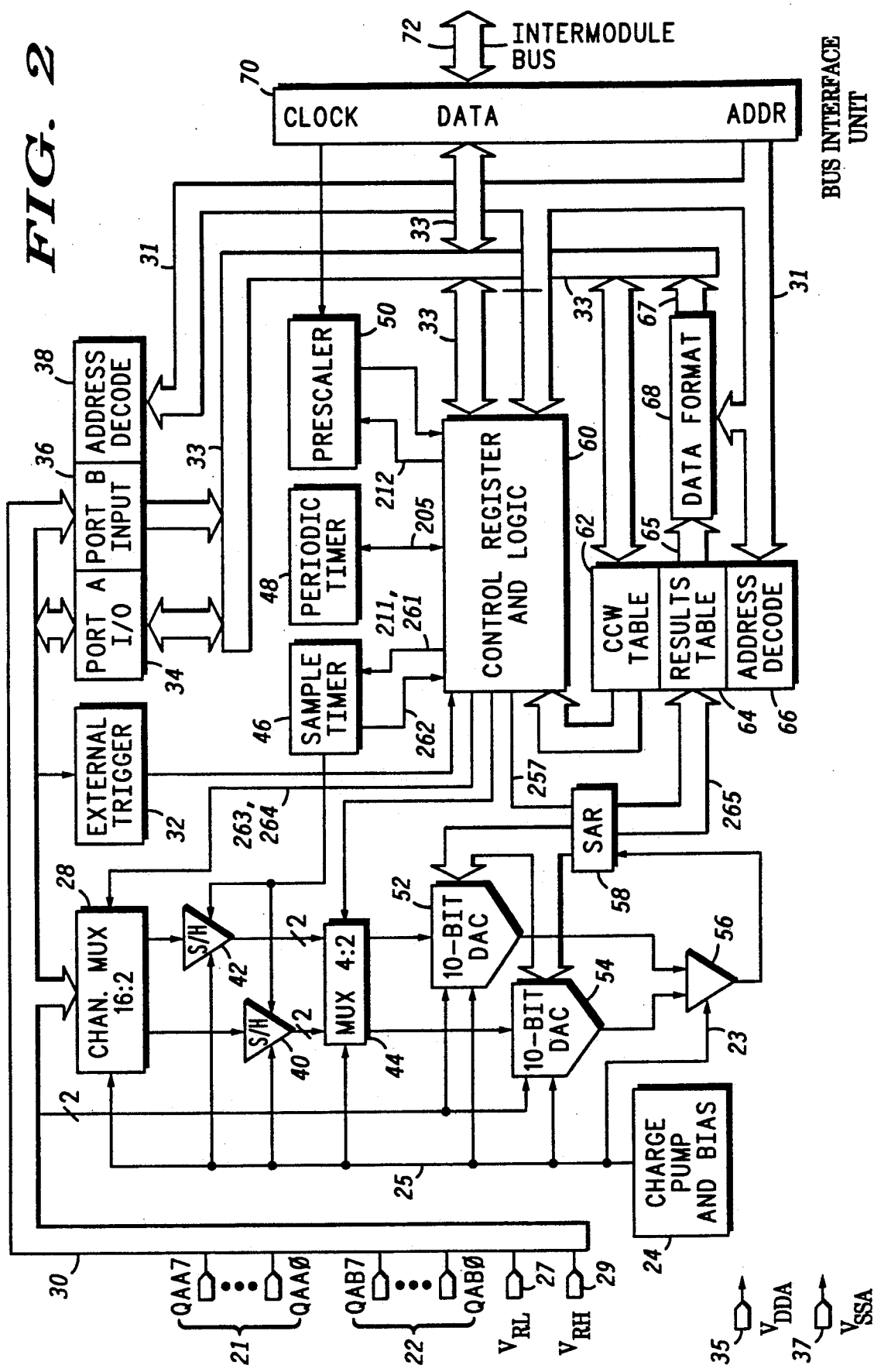
FIG. 2 shows a block diagram of the A/D converter module of the present invention.

FIG. 2 shows a block diagram of the A/D converter module of the present invention. The Queued A/D Converter module (QADC) 1 comprises Port A, indicated by reference numeral 21, including pins QAA0–QAA7, and Port B, indicated by reference numeral 22, including pins QAB0–QAB7. Ports A and B are coupled to bus 30. A pair of reference voltages $V_{RL}$ 27 and $V_{RH}$ 29 are also coupled to bus 30.

Also coupled to bus 30 are a Channel MUX (16:2) 28; an External Trigger circuit 32; Port A I/O circuit 34; and Port B input circuit 36. Address Decode circuit 38 is coupled to Port A I/O circuit 34 and Port B input circuit 36.

The Queued A/D Converter module 1 comprises a 10-bit successive approximation converter portion which includes Sample-and-Hold circuits 40 and 42; a 4:2 MUX 44; 10-bit Digital-to-Analog Converter (DAC) 52; 10-bit Digital-to-Analog Converter (DAC) 54; Comparator 56; and Successive Approximation Register (SAR) 58.

It will be apparent to those of ordinary skill in the art that the successive approximation converter may comprise more or fewer than 10 bits. It will also be apparent that the Digital-to-Analog Converter may be of the resistive-only type, the capacitive-only type, or the resistive/capacitive type.

Charge Pump and Bias circuit 24 provides bias voltages to MUXs 28 and 44, to Sample-and-Hold circuits 40 and 42, to DAC 52 and DAC 54, and to Comparator 56.

The Queued A/D Converter module 1 further comprises a Bus Interface Unit (BIU) 70 coupled to an Intermodule Bus 72. The Intermodule Bus 72, which transmits clock, data, control, and address information bi-directionally, may be coupled to other portions of a data processing system.

Coupled to Bus Interface Unit 70 via internal address bus 31 are Address Decode circuit 38; Control Register and Logic circuit 60; Data Format circuit 68; and Address Decode circuit 66.

Also coupled to Bus Interface Unit 70 via internal data bus 33 are Port A I/O circuit 34; Port B Input circuit 36; Control Register and Logic circuit 60; and Data Format circuit 68.

Also coupled to Control Register and Logic circuit 60 are External Trigger 32; Sample Timer 46; Periodic Timer 48; Prescaler circuit 50; a random access memory (RAM) storing a table of Command Control Words (CCWs) 62 and a Results Table 64; an Address Decode circuit 66; SAR 58; 4:2 sample and hold MUX 44; and 16:2 Channel MUX 28.

Also coupled to the Queued A/D Converter module 1 are suitable analog power supply voltages via pins $V_{DDA}$ 35 and $V_{SSA}$ 37.

External Pins

In a preferred embodiment, 16 analog channels are provided in the internal multiplexing circuitry of the QADC module 1. The number of channels available externally depends upon package pin availability, and whether external multiplexing is employed. The number of channels in an expanded, externally multiplexed mode can be a maximum of 44 in a preferred embodiment (with a 6-bit CCW CHAN field there are also four internal channels and an End-of-Queue control word). It should be understood by one of ordinary skill in the art that the channel field may optionally be increased or decreased to allow more or fewer channels.

The QADC module 1 has up to twenty-five external pins as shown in FIGS. 1 and 2. All of these pins except the power pins, reference pins, dedicated external trigger pins, and dedicated multiplexed address pins can be used as general purpose digital port pins. Lower pin-count versions of the QADC module 1 can be produced by reducing the number of channel/port pins. Versions with as few as twelve pins may comprise eight analog channels, two power pins, and two reference pins.

Control Register and Logic Circuit

Figure 3:
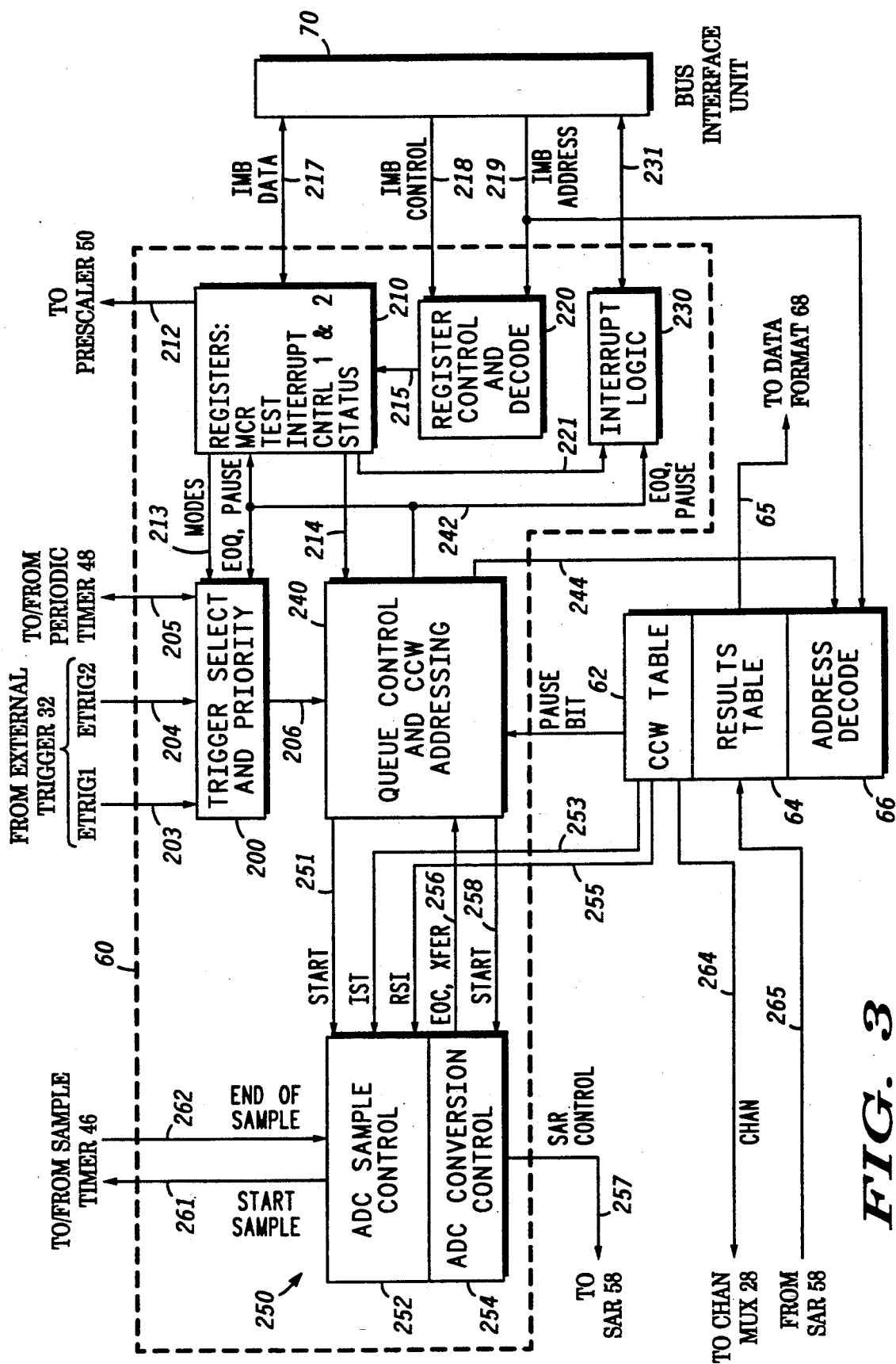
FIG. 3 shows a block diagram of the Control Register and Logic circuit 60 illustrated in FIG. 2.

FIG. 3 shows a block diagram of Control Register and Logic circuit (shown generally within the dashed line and indicated by reference numeral 60) and various signal paths between it and Bus Interface Unit 70, CCW Table 62, Results Table 64, Address Decode circuit 66, and other circuitry shown in FIG. 2.

Control Register and Logic circuit 60 comprises Trigger Select and Priority circuit 200, Registers 210, Register Control and Decode circuit 220, Interrupt Logic 230, Queue Control and CCW Addressing circuitry 240, and ADC Sample Control and Conversion Control (indicated generally by reference numeral 250).

The Trigger Select and Priority circuit 200 is responsible for determining the type of trigger for initiating an A/D conversion sequence, in response to mode information from the Register circuitry 210. It is also responsible for selecting Queue 1 or Queue 2 for the conversion sequence in response to control information decoded by the control registers.

The Trigger Select and Priority circuit 200 is responsive to external trigger signals ETRIG1 and ETRIG2 via lines 203 and 204, respectively. Trigger Select and Priority circuit 200 is also coupled to the Periodic Timer 48 via line 205. Trigger Select and Priority circuit 200 is responsive to mode control signals from the control registers via line 213. Trigger Select and Priority circuit 200 is also responsive to an End-of-Queue (EOQ) signal and a Pause signal via line 242 from Queue Control and CCW Addressing circuitry 240. Trigger Select and Priority circuit 200 generates control signals to Queue Control and CCW Addressing circuitry 240 via signal path 206.

It will be understood by those of ordinary skill in the art that the terms "signal path" or "line", as used herein, may refer to a single conductor or a multiple-conductor bus, or other suitable signal path, as appropriate to the implementation.

Register circuitry 210 comprises the registers shown in FIG. 6 and not otherwise shown in FIG. 2; i.e., a Module Configuration Register, a Test Register, an Interrupt Register, Control Registers 1-2, and a Status Register. One function of the Register circuitry 210 is to enable the automatic control of the operation of the QADC, once the registers are loaded by the host system software.

Register circuitry 210 generates control signals to the Prescaler 50 via line 212, to Trigger Select and Priority circuit 200 via line 213, to the Queue Control and CCW Addressing circuit 240 via line 214, and to Interrupt Logic 230 via line 221.

Register circuitry 210 receives control signals from Register Control and Decode circuit 220 via signal path 215. Register circuitry 210 receives an End-of-Queue (EOQ) signal, a Pause signal, and other signals via line 242 from Queue Control and CCW Addressing circuitry 240.

Register circuitry 210 is also coupled to Bus Interface Unit 70 via bi-directional bus 217.

Register Control and Decode circuit 220 receives control and address information via busses 218 and 219, respectively, from Bus Interface Unit 70 and generates control signals to Register circuitry 210 via signal path 215. The function of Register Control and Decode circuit 220 is to provide control and addressing circuitry for the various registers within Register circuitry 210.

Interrupt Logic 230 operates to generate an interrupt signal to the host central processing unit (CPU) upon conclusion of a conversion sequence (if enabled). Interrupt Logic 230 receives control signals and status information from Register circuitry 210 via signal path 221. Interrupt Logic 230 receives an EOQ signal and a Pause signal via line 242 from Queue Control and CCW Addressing circuitry 240. Interrupt Logic 230 is also coupled to the Bus Interface Unit 70 via signal path 231.

Queue Control and CCW Addressing circuitry 240 is responsible for controlling CCW addressing and the start of sampling and conversion operations. The Queue Control and CCW Addressing circuitry 240 receives control signals from the Trigger Select and Priority circuit 200 via line 206, from the Register circuitry 210 via line 214, and from the ADC (Analog to Digital Converter) Conversion Control circuit 254 via line 256. The Queue Control and CCW Addressing circuitry 240 generates control signals to the Trigger Select and Priority circuit 200, to the Register circuitry 210, and to the Interrupt Logic circuitry 230 via line 242. It also generates control signals to the Address Decode circuitry 66 via line 244, to the ADC Conversion Control circuit 254 via line 258, and to the ADC Sample Control 252 via line 251.

ADC Sample Control 252 is responsible for notifying the S/H circuits 40 and 42 (refer to FIG. 2), via the Sample Timer 46, to begin sampling. It is also responsible for notifying the ADC Conversion Control 254 when sampling is completed. The ADC Sample Control 252 receives control signals from Sample Timer 46 via line 262, from Queue Control and CCW Addressing circuit 240 via line 251, and from the CCW Table via line 253 (Input Sample Time) and line 255 (Re-sample Inhibit). It generates control signals to the Sample Timer 46 via line 261 and to the ADC Conversion Control 254.

The ADC Conversion Control 254 is responsible for initiating a conversion operation by the SAR 58 and for informing the Queue Control and CCW Addressing circuit 240 upon conclusion of the conversion operation. The ADC Conversion Control 254 receives control signals from the ADC Sample Control 252. It also receives control signals from the Queue Control and CCW Addressing circuit 240 via line 258, and it generates control signals to the SAR 58 via line 257.

As shown in FIG. 3, in response to a CCW, CHAN control signals are transmitted to the CHAN MUX 28 via line 264.

Upon conclusion of a conversion operation, a digital value is transmitted via line 265 from SAR 58 and stored in Results Table 64.

Intermodule Bus (IMB) Interface

FIG. 4 is a table defining the Intermodule Bus (IMB) signals of the QADC module 1 of the present invention.

The address bus IADDR and data bus IDATA, along with their associated control and handshake lines, are used to transfer data between the IMB 72 and the QADC module 1.

The reset signal IMSTRSTB initializes certain register bits to their default states. These default states are described in the register descriptions below. The master reset signal IMSTRSTB and system reset signal ISYSRSTB are used to reset the BIU (Bus Interface Unit) state machine.

ISIZ and IADDR are used to determine the size of data (byte or word). The QADC module 1 has certain bits that are only accessible in test mode, and the ITSTMODB line is used for test mode operation.

Address Map

FIG. 5 shows an address map (indicated generally by reference numeral 75) for the control registers, Conversion Command Word table, and the Conversion Result Table of the QADC module 1. Each address, such as $x030, is the hexadecimal representation of a base address and an offset. The "x" portion of the address is the base and the numerical portion is the offset. The "x" indicates that the base address portion of each address is the same value "x", but that "x" is a variable and can be changed. Thus the address map 75 shown in FIG. 5 can be moved to various locations in the global memory map by changing the value of the base address "x". Alternate embodiments of the present invention may use different memory addresses for the registers and tables in FIG. 5.

The QADC module 1 utilizes 512 bytes, or 256 words, of address space, as shown in FIG. 5. Of the words actually implemented, 8 words are control, status, and port registers (indicated generally by reference numeral 80), 40 words are Conversion Command Words (indicated generally by reference numeral 81), and 40 words are used for each data format type of the result table (indicated generally by reference numerals 83, 85, and 89, respectively).

The first block 80 of the address map 75 contains the 8 words used for control, status, and port information. These permit a host data processing system to initialize the QADC module 1 into the desired configuration and mode of operation. Also included are status bits that the host system may read to identify an interrupt and to determine other information about the conversion operation of the QADC module 1. The content of these registers is shown in somewhat greater detail in FIG. 6.

The next block 81 of the address map 75 is the Conversion Command Word table. In the current embodiment there are 40 words to hold the desired A/D conversion sequences, but this could optionally be increased or decreased. In the current embodiment, a Conversion Command Word (CCW) is a 16-bit word, with ten implemented bits in three fields, and six bits which are not implemented. However, alternate embodiments of the present invention may optionally use these non-implemented bits to increase the size of an existing control field or to create a new control field.

The content of the CCW 82 is illustrated in FIG. 7. Each CCW provides the converter with a channel number (CHAN), an input sample time (IST), and a Pause bit (PAUSE). Each CCW causes the converter to take two input samples, convert one of the analog values, put the result in the corresponding word of the result register table, and determine whether the next CCW is to be serviced. In addition the CCW may include one or more optional control fields if desired, such as a field to specify the converter resolution and a field to designate the data result alignment. The fields of the CCW and their functions are explained in greater detail below under the sub-heading "Conversion Command Word".

The result register can be read at the address ranges shown as Conversion Result Tables 83, 85, and 89. There is in actuality a single result register table but three different ways in which to read it, as explained in the section below entitled "A/D Result Data Format Options".

Thus there is one 40-word Conversion Result Table that appears in three places in the address map 75. The first block 83 presents the result data in right-justified (unsigned) format, the second block 85 is in left-justified (signed) format, and the third block 89 is a left-justified (unsigned) result.

Details on the control registers, status registers, port registers, and the CCW are provided below. Read accesses of reserved register locations or unused bits return "0" and writes to reserved and unused space have no effect on the QADC operation.

Conversion Command Word Table

Figure 8:
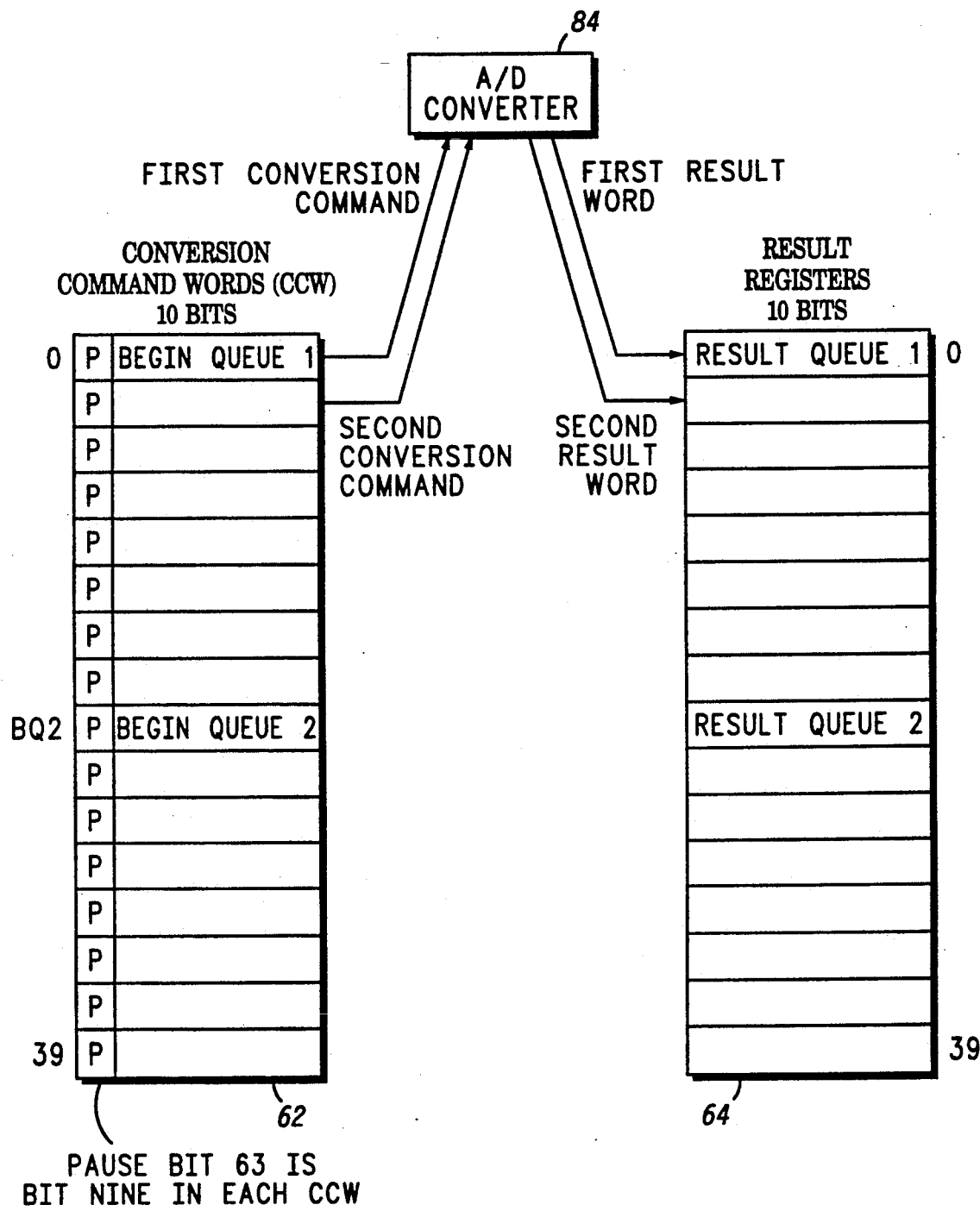
FIG. 8 is a conceptual diagram showing how Conversion Command Words are used to produce Result Words which are stored in the Conversion Result Table.

FIG. 8 is a conceptual diagram showing how Conversion Command Words are used to produce Result Words which are stored in the Conversion Result Table.

The central element in software control of the QADC module 1 is the Conversion Command Word Table. In a preferred embodiment, there are two queues in the table which, depending on the application, can be operated in several different trigger modes and effective scan rates. It will be apparent to one of ordinary skill that more or fewer than two queues may be employed.

There are two reasons for including two queues in the QADC. One reason is that there are two different cases for automatically scanning analog input channels. One case is to get one sample from all or some analog input pins.

The other case is to automatically take multiple samples of one channel in rapid succession, so that host system software can use smoothing algorithms to calculate a more accurate value. In either case, an automatic scan that puts the results in a table saves the host system software from having to initiate each conversion, wait, get the result, and save it. The CCW table architecture permits the host system software to use either method, or even a combination; for example, 16 results could be used for four samples on each of four channels.

The other reason for providing two CCW queues is that two different operating modes can be used at the same time. Usually, analog inputs on some channels need to be converted often because they have rapidly changing values, whereas analog inputs on other channels change relatively slowly, such as temperature drift, battery voltage, and operator inputs.

In a preferred embodiment, Queue 1 is normally utilized for frequently occurring or time-critical conversion sequences. Queue 2 is normally utilized for relatively infrequent or non-time-critical conversion sequences. When a conversion sequence is initiated from Queue 1, any conversion in progress from Queue 2 is aborted. When the Queue 1 conversion sequence is completed, the aborted Queue 2 conversion sequence is restarted.

The host system software can receive an interrupt that occurs just after the Conversion Result Table has been filled with newly converted digital values from either queue. The interrupt permits the host system software to analyze newly converted values when they are fresh.

The host system software is relieved of the burden of initiating the A/D conversion sequence, of initiating each A/D conversion, and of moving each result to host system RAM. Thus the QADC module 1 absorbs the overhead of running the A/D converter system. The host system software only needs to program the QADC initially and then analyze the on-going results.

The following sections describe the basic operation of the CCW queues and the various modes that use the CCW queues.

Conversion Queue Operation

To prepare the QADC module 1 for a conversion sequence, the host system software fills up the table of Conversion Command Words (reference numeral 81 in FIG. 5 and reference numeral 62 in FIG. 8) to establish the desired conversion sequences. The host system software establishes the criteria for initiating the conversion sequences in Control Registers 1 and 2. Other registers also require initialization, for example, the Module Configuration Register and the Interrupt Register.

The sequences may be initiated (triggered) by a host system software command, the elapse of the QADC module periodic timer interval, an external trigger signal, or the completion of the previous conversion sequence (i.e. continuous mode). By whichever method the sequence of conversions is initiated, the conversions progress in the same way.

After the CCW table and all of the control registers are initialized, the QADC waits for a trigger condition for either queue. When triggered, the A/D converter obtains the first CCW from the triggered queue and executes it. Refer to FIG. 8.

The first part of a conversion is the sample phase. Once the sampled analog level is transferred to the converter, the sample-and-hold circuits proceed with sampling as indicated by the next CCW.

The CCW specifies a programmable sample time. Each sample time is a specified number of conversion clock cycles. The slower sample times are chosen for high impedance sources or for specific delay intervals.

When each analog-to-digital conversion is complete, the result is written to the corresponding location in the Conversion Result Table. The converter then obtains the next CCW from the queue and proceeds with that conversion.

The QADC executes each CCW in the queue until one of three End of Queue (EOQ) indications is detected. One EOQ condition is reaching the physical end of the Queue RAM space, 40 locations in the preferred embodiment. The second EOQ condition is when the BQ2 pointer is reached (see FIG. 8), which indicates the split of the RAM between Queue 1 and Queue 2. This method applies only for indicating the end of Queue 1. The third indication is a CCW with an EOQ code instead of a normal channel selection. When enabled, Queue Conversion Sequence Complete Interrupts are issued to the host system software.

Prescaler

The QADC module uses the IMB System Clock signal as the time base for conversion. The A/D conversion needs a clock signal in a fairly narrow range, and the IMB clock "ICLOCK" varies widely among applications. The Prescaler (50, FIG. 2) is a modulus-programmable divider that allows the A/D conversion clock to be within the specified range with a wide range of System Clock frequencies. The Prescaler can be used to optimize the A/D conversion time by selecting a System Clock frequency that is an even multiple of the fastest A/D conversion time.

External Trigger Continuous Mode

Some applications need to synchronize the sampling of analog channels to external events. The QADC module 1 provides external trigger pins for one or both queues, depending on the QADC pin version implemented. When the continuous external trigger mode is selected, a transition on the associated trigger pin initiates the queue execution. Each CCW is read and the indicated conversions are performed until an end of queue condition is encountered. Being a continuous mode, when the next trigger edge is detected, the queue execution begins again automatically. No software initialization is needed between trigger events. The polarity of the trigger signal is programmable, so that the software can choose to begin queue execution on the rising or falling edge.

The external trigger mode is useful when an analog input needs to be sampled at a precise point in the motion of a high speed device, such as a rotating engine component. There are cases when it is not possible to use software initiation of the queue scan sequence, since software interrupt response time varies. The source of the external trigger signal could be the output of an external timer channel. When an external trigger pin is not needed for an external trigger signal, the pin may be used for an analog input or for general purpose digital I/O (Input and/or Output).

External Trigger Single-Scan Mode

The single-scan external trigger mode is a variation of the continuous mode. The single-scan external trigger mode is available with both Queue 1 and Queue 2 when external trigger pins are available. The software enables the scan to occur with a start command. The occurrence of the first trigger edge after the start command causes the queue to be executed once. Any other trigger edges are ignored until the software issues another start command. The software also provides the polarity of the edge that is to be detected, either a rising edge or a falling edge.

One use for the external trigger single-scan mode occurs when the input trigger rate may exceed the queue execution rate. In such a case, the software would get more completion interrupts than can be handled. It can still be desirable to have the analog samples taken in synchronization with an external event, even though the software is not interested in data taken from every edge. So the software can start the single-scan external trigger mode and get one set of data; and then at a later time, start the mode again for the next set of samples. Another use for the single-scan mode occurs when the software needs to change the polarity of the trigger so that both the rising and falling edges cause queue execution.

Periodic Timer Mode

The QADC module 1 includes a dedicated periodic interval timer for initiating a scan sequence on Queue 2 only. Software selects a programmable timer interval ranging from 128 to 128K. times the QADC clock period in binary multiples. The QADC clock period is prescaled down from the IMB MCU clock. The QADC 1 waits for the timer interval to elapse, and then begins queue execution with the first CCW in Queue 2. The QADC 1 automatically performs the conversions in the queue until an end of queue condition is encountered. The periodic timer keeps counting, and the next time the interval expires, the queue execution is repeated.

Typically, the software enables the completion interrupt when using the periodic timer mode. When the interrupt occurs, the software knows that the periodically collected analog results have just been taken. It is common software usage for Queue 2 to be in the periodic or continuous mode, while Queue 1 is in the externally triggered mode. The periodic mode is selected for Queue 2 rather than the continuous mode when the software needs to known when the results are coherent, in other words, when all of the samples were taken in the same scan of the analog pins. Coherency is needed when the software is comparing two or more samples taken at, or nearly at, the same time. The periodic mode is also chosen when the interrupt rate in the continuous mode would be too high.

Single-Scan Time Interval Mode

Queue 2 can also use the periodic timer in a single-scan mode. When the software provides a start command, the timer starts timing. When the time interval expires, the queue is triggered once. The timer remains idle until the software issues another start command. The timer interval can range from 128 to 128K QADC clock cycles in binary multiples. The single-scan time interval mode serves applications where the software needs to synchronize the next samples of the analog channels.

Continuous Scanning Mode

In the continuous scanning mode, when the end of queue is reached, the next CCW is taken from the beginning of the queue. The continuous mode keeps the result registers updated automatically. The software can always read the result table to get the latest converted value for each channel. The continuous scanning mode may be chosen for either queue, but is normally used only with Queue 2. If continuous scanning is chosen for Queue 1, Queue 1 operates continuously, and Queue 2, being lower in priority, never gets to execute. The continuous scanning mode is a common choice for Queue 2 for converting the channels that need not be synchronized to anything.

Software Initiated Single-Scan Mode

Software can initiate the execution of a scan sequence for Queue 1 or Queue 2 by selecting the software initiated single-scan mode and writing a start command bit. The QADC 1 immediately begins execution of the first CCW in the queue. The QADC 1 automatically performs the conversions in the queue until an end of queue condition is encountered. Then the queue remains idle until the software again issues the start command. The software initiated single-scan mode gives all control of conversions to the software. The software can create a one-word queue to essentially emulate an A/D converter that has one channel select command and one result register. The software initiated single-scan mode can be used to initiate queues of any length, up to the full size of the queue RAM.

Pause After Conversion

Each of the operating modes discussed above can use the pause feature to break each queue up into multiple sub-queues. In a preferred embodiment, the pause mechanism is implemented with a bit in each CCW. When the QADC 1 encounters a CCW with the Pause bit set, the queue enters the pause state after the conversion specified in that CCW is completed. The Pause flag is set upon completion of the pause CCW and a pause software interrupt may optionally be issued. The QADC 1 then waits for another trigger to again begin queue execution.

The software can establish any number of sub-queues within either Queue 1 and/or Queue 2 simply by setting the CCW Pause bit in the last CCW before each pause. The pause state is the same as queue completion, except that the CCW to be executed when the next trigger occurs is the one following the CCW with the Pause bit set, not the CCW at the beginning of the queue.

As an example, if either Queue 1 or Queue 2 was divided into six sub-queues, six consecutive triggers would cause the six different sub-queues to be executed. Then the sequence of six sub-queues would start over with the first sub-queue again. The external trigger continuous mode and the periodic timer mode operate in this manner.

In a preferred embodiment, the circuitry within the QADC 1 actually implements the continuous scanning mode by causing the QADC 1 to enter and then immediately exit the pause state. This entering and exiting of the pause state is, in most ways, transparent to the user of the QADC module 1. Other embodiments of the present invention may instead prevent the QADC 1 from even entering the pause state when the continuous scanning mode is being used. The Pause flag is still set when a Pause bit is encountered in the continuous scanning mode. Thus the Pause bit, in conjunction with the Pause flag, can be used to initiate an interrupt at a chosen point in the continuous scan.

In the single-scan modes, software involvement is needed after the completion of each queue, but not after each pause. When a Pause bit is encountered, the pause state is entered and a new trigger is awaited. When a new trigger is received, the pause state is exited and queue execution continues. After execution of the queue has completed, the software must restart the queue with a command before the QADC 1 recognizes the trigger condition that allows the queue to be restarted.

Software Interrupts

The software can receive interrupts from the QADC 1 in four different situations. Each is separately enabled by the software. There are two interrupts associated with each queue. Each time the result is written for the last CCW in a queue, the complete flag for the corresponding queue is set. When so enabled, an interrupt request is also initiated to the CPU. In the same way, each time the result is written for a CCW that contains a Pause bit, the queue Pause flag is set. And when enabled, the Pause flag also creates an interrupt request.

The pause and compete interrupts for Queue 1 and Queue 2 each have a separate vector to allow the software to identify each source. The two Queue 1 interrupt sources share one software programmable interrupt request level. Likewise, the two Queue 2 interrupt sources share one software programmable interrupt request level. Queue 1 and Queue 2 can thus have different priorities in the overall interrupt hierarchy of the MCU (microcontroller).

When interrupts are not needed, the software can monitor the completion flag and the Pause flag for each queue in the status register. Whether software polling or interrupts are used, the software clears each flag bit by reading the status flag as a one and then writing a zero to that bit.

External Multiplexed Inputs

The number of analog inputs to the QADC may be expanded in the externally multiplexed mode. The full flexibility of the automatic scanning queues are available to externally multiplexed channels. Three of the analog channels (MA0-MA2, FIG. 1) are redefined to act as address bit outputs, and four input pins (ANw, ANx, ANy, and ANz) are expanded to represent eight input channels each. This allows a total of four external multiplexers for a total of 32 external channels. Commercially available analog multiplexers such as the MC14051, MC14052, MC74HC4051, and MC74HC4052 available from Motorola, Inc. may be used.

FIG. 1 provides an example of externally expanding the number of channels in this manner. The preferred embodiment may be used with 0, 1, 2, 3, or 4 external MUXs.

FIG. 9 is a table illustrating how the 6-bit CHAN field in the CCW specifies which input pin is converted with and without external multiplexing.

For example, with the MUX bit in Control Register 1 equal to 0 (i.e. no external MUX), CHAN field=000000 designates Analog Input pin AN0.

Referring now also to FIG. 1 and external multiplexer 10, with MUX field equal to 1 (i.e. external MUX) and CHAN field=00xxx0, one of the inputs into MUX 10 (AN0, AN2, AN4, AN6, AN8, AN10, AN12, or AN14) is selected and coupled into pin ANw by the appropriate portion of the CHAN field value "xxx". For example, CHAN field 000000 selects input AN0; CHAN field 000010 selects input AN2; and so on.

Referring now to external multiplexer 12, with MUX field equal to 1 (i.e. external MUX) and CHAN field=00xxx1, one of the inputs into MUX 12 (AN1, AN3, AN5, AN7, AN9, AN11, AN13, or AN15) is selected and coupled into pin ANx by the appropriate portion of the CHAN field value "xxx". For example, CHAN field 000001 selects input AN1; CHAN field 000011 selects input AN3; and so on.

Referring now to external multiplexer 14, with MUX field equal to 1 (i.e. external MUX) and CHAN field=01xxx0, one of the inputs into MUX 14 (AN16, AN18, AN20, AN22, AN24, AN26, AN28, or AN30) is selected and coupled into pin ANy by the appropriate portion of the CHAN field value "xxx". For example, CHAN field 010000 selects input AN16; CHAN field 010010 selects input AN18; and so on.

Referring now to external multiplexer 16, with MUX field equal to 1 (i.e. external MUX) and CHAN field=01xxx1, one of the inputs into MUX 16 (AN17, AN19, AN21, AN23, AN25, AN27, AN29, or AN31) is selected and coupled into pin ANz by the appropriate portion of the CHAN field value "xxx". For example, CHAN field 010001 selects input AN17; CHAN field 010011 selects input AN19; and so on.

For all external multiplexer modes, three of the internally multiplexed pins (QAA0, QAA1, and QAA2) become multiplexer address outputs MA0, MA1, and MA2, respectively.

FIG. 9 shows that either four, three, two, one, or no external multiplexers can be used, and that the use of the I/O pins varies. The channel numbers used by the host system software in the CCWs varies too with the different multiplexing modes. It will be apparent to one of ordinary skill in the art that the herein-disclosed method of sampling external MUXs may be utilized with MUXs with fewer or more analog input pins, and that the number of MUXs may be varied, and that the channel numbers assigned may be different.

FIG. 10 is a table which shows the number of analog channels available with different numbers of external multiplexer chips for the various implementations possible, in terms of the number of I/O pins allocated to the OADC module 1. For example, in the 16-pin version, a total of twelve analog channels are available with no external MUX chips; sixteen analog channels are available with one external MUX chip; twenty-three analog channels are available with two external MUX chips; etc.

Simultaneous Sampling

Simultaneous sampling may be used for receiving and converting differential or other special signal pairs. The QADC allows two adjacent analog input channels, identified by ignoring the lowest-order bit of the CHAN field in the CCW, to be samples at the same time. Two adjacent analog channels are always sampled simultaneously, but only one is converted with each CCW. To convert a simultaneous analog sample from the second channel, the CCW inhibits re-sampling in the next CCW.

Input Sample Time

The sample time may be altered through host system software control. Different analog signal source impedances may thus be used. Allowing higher source impedances can eliminate the cost of an external amplifier. The trade-off is a longer sample time.

By host system software selection, the system clock and prescaler output (based on the system clock) are used as a time base. In an alternate embodiment of the present invention, an on-chip RC (resistor-capacitor) oscillator might also be used as a time base. The sample time is programmable for up to 64 QADC clock cycles in a preferred embodiment.

A/D Result Data Format Options

FIG. 11 illustrates the data format options of Result Words stored in the Conversion Result Table. The QADC 1 includes a table of Conversion Result Registers, readable in any of at least three data format options for each Result Word.

One option is with the 10-bit result right-justified in the 16-bit word, with zeros in the higher order unused bits. Another choice is a left-justified result with zeros in the lower order unused bits. The third option is a left-justified result with the most significant bit inverted and with zeros in the unused lower order bits. This third option corresponds to a "half-scale, offset binary, twos-complement" data format, which is useful in digital signal processing applications. Another option, not implemented in the embodiment illustrated herein, is a right-justified, signed format. In addition, a right-justified, sign-extended format (with leading 0's or 1's, depending upon the sign) could be provided.

In the embodiment of the present invention illustrated in FIG. 8, the Conversion Result Registers are 10 bits wide. Alternate embodiments may use any number of bits. In the illustrated embodiment, the remaining six bits of each 16-bit word are not implemented. The result data formatting, illustrated in FIG. 11, is produced during host system software read operations, since the address range where the results are read is used to select the desired data format. Refer to FIG. 21 and the accompanying description below under the heading "Result Word Format Options", for further information concerning the various data format options.

Write operations, including read-modify-write instructions like bit manipulation, do not access a true 16-bit value. Since the 10-bit result is stored in a 10-bit register or memory word, 6 bits are saved, thereby reducing the silicon area of the integrated circuit.

Data Processing System

Figure 17:
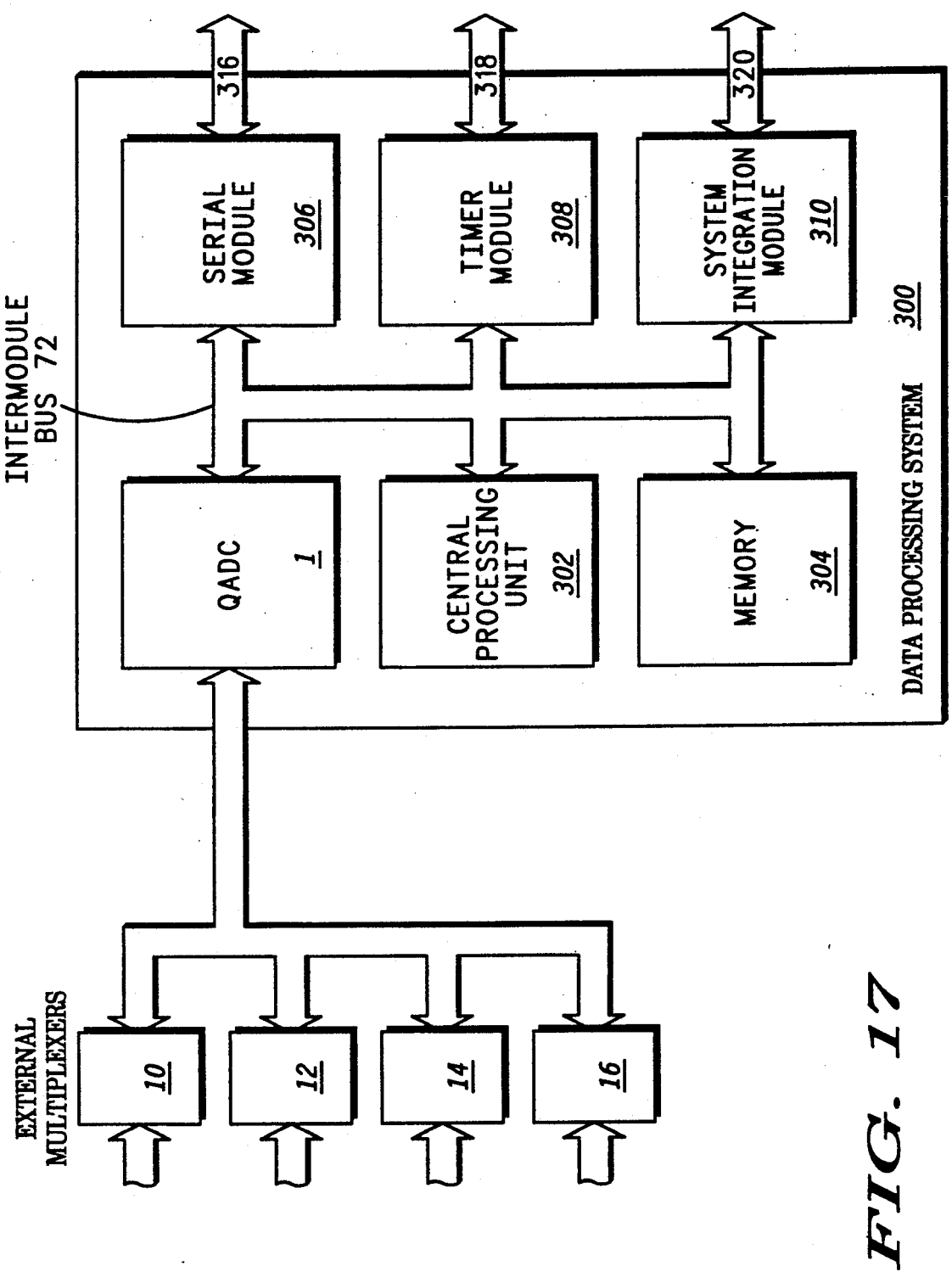
FIG. 17 shows a data processing system having an A/D converter module in accordance with the present invention.

FIG. 17 shows an example of how a Queued A/D Converter module (QADC) 1 can be used as part of a data processing system 300. Data processing system 300 has a QADC 1, a central processing unit (CPU) 302, a memory 304, a serial module 306, a timer module 308, and a system integration module 310, which are all bi-directionally coupled to Intermodule Bus 72. Intermodule Bus 72 is capable of receiving and transmitting signals external to data processing system 300 through system integration module 310. External multiplexers 10, 12, 14, and 16 are all bi-directionally coupled to QADC 1. External multiplexers 10, 12, 14, and 16 receive analog inputs AN0–AN31 as shown in FIG. 1.

In some embodiments of the present invention, serial module 306 may be coupled external to data processing system 300 by way of pins 316; timer module 308 may be coupled external to data processing system 300 by way of pins 318; and system integration module 310 may be coupled external to data processing system 300 by way of pins 320. In some embodiments of the present invention, data processing system 300 may be located on an integrated circuit.

Register Descriptions

This section discusses the detailed formats of the control, status, digital port, and CCW information that the host system software provides to the QADC and obtains from the QADC. Four types of word format are discussed in the following subsections. First are the control words that the host system software provides to configure and initialize the QADC module. Second are the digital data ports. Third is a status word that the host system software reads to determine the current operation of the QADC, including interrupt flags. Last is the Conversion Command Word for each A/D conversion that is provided by the host system software in the CCW queue.

Module Configuration Register (MCR)

FIG. 12 shows the format of the Module Configuration Register of the QADC module 1.

The Module Configuration Register includes initialization information from the host system software to the QADC. This information is typically set up once on power-up and not changed during normal operation, though it may be changed when needed. Included are stand-by mode selection, supervisor space selection, interrupt arbitration, and debug mode selection.

STOP-Stop Mode (Bit Position: 15)
Function: Stop mode select (stop clocks, power down analog circuits)
Reset State: STOP=%0

The host system software can disconnect the clock signal to the A/D converter and power down the analog circuits to reduce power. When set, the STOP bit aborts any conversion sequence in progress. Because the bias currents to the analog circuits are turned off, the QADC module requires some recovery time to stabilize the analog circuits after clearing the STOP bit.

FRZ-Freeze Enable (Bit Position: 13-14)
Function: Freeze Enable (suspend module operation)
Reset State: FRZ=% 00

By programming the logic state of the FRZ bits, the software determines whether the QADC 1 responds to an IMB IFREEZE signal assertion. When FRZ=00, the IMB IFREEZE signal is ignored. When FRZ=10 and the IMB IFREEZE signal is asserted, the QADC 1 completes the current conversion, saves the current queue pointer, and enters a freeze state. In this freeze state, the QADC clock is stopped so that the periodic timer does not advance and so that any external trigger events are not recorded.

When the IMB IFREEZE signal is then negated, the QADC 1 exits the freeze state and restarts automatically with the next CCW. The user can force the QADC 1 to execute a different CCW after exiting the freeze state by changing the queue operation modes or asserting an external trigger signal after negating the IMB IFREEZE signal.

SUPV Supervisor Space (Bit Position: 7)
Function: Suprerisor space selection
Reset State: SUPV=%1

Some host CPU's and software systems permit two addressable spaces: unrestricted space accessible to any software, and supervisor space which is accessible only from system software (the operating system). Other host CPU's do not include this option and are thus always in the supervisor mode from the vantage point of the QADC. The first three register word locations in the RAM register table (80, FIGS. 5 and 6), which are the Module Configuration Register, Test Register, and Interrupt Register, are always in the supervisor space. The remaining Control, Status, and Port registers, the CCW Table, and the Results Table are programmable via the SUPV bit.

FIG. 13 illustrates the use of the SUPV bit of the Module Configuration Register of the QADC. When SUPV=1, all QADC Status, Control, and Port registers, the CCW Table, and the Results Table are accessible only in the Supervisor mode. When SUPV=0, they may be accessed in either the Supervisor or unrestricted modes. When the QADC is used with a host CPU that does not support Supervisor/unrestricted modes, the state of the SUPV bit is unimportant.

IARB Interrupt Arbitration Number (Bit Position: 0-3)
Function: Define interrupt arbitration priority number
Reset State: IARB=% 0000

Figure 14:
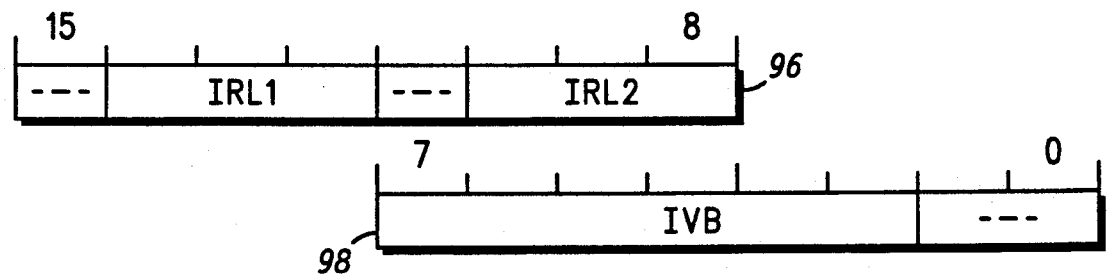
FIG. 14 shows the format of the Interrupt Register of the A/D converter module.

Within the QADC, the interrupt level is assigned to each interrupt source via the Interrupt Register (FIG. 14). Since multiple IMB modules could request an interrupt on each interrupt level, the priority of the interrupt within the assigned level is established with the IARB field.

Once the host CPU begins to process an interrupt request at a particular level, an arbitration cycle determines which interrupt is to be served of those requesting on that level. The 0000 state of IARB is not valid, leaving up to 15 IMB modules that can arbitrate for interrupt service. The lowest priority is 0001 and the highest is 1111.

It is the responsibility of the initialization host system software to ensure that the seven bits that establish the interrupt level and priority (IRL1 and IRL2, plus IARB) are unique throughout the entire system. Successful interrupt arbitration depends on no two interrupts causing the same level and priority to be used on the Intermodule Bus (IMB).

Test Register

The Test Register controls various test modes which are used during manufacturing, and is not intended to be used in a normal application. The Test Register can only be written in the test mode, when the ITSTMODB line on the IMB is asserted. In the non-test mode the Test Register can only be read, but writes have no effect.

Interrupt Register

In one embodiment of the present invention, the Intermodule Bus (IMB) requires three things to fully identify an interrupt request. First, the request must be asserted on one of seven levels. Two 3-bit software-provided parameters establish the request level for each queue. Then, one of 15 possible priorities within that level is determined by an arbitration process on the IMB. The QADC includes 4-bits in the Module Configuration Register for the arbitration priority. Third, an 8-bit vector number is provided on the IMB to identify the software entry point for each interrupt source.

FIG. 14 shows the format of the Interrupt Register of the QADC module 1.

IRL1—Interrupt Level 1 (Bit Position: 12-14)
Function: Define Queue 1 interrupt level
Reset State: IRL1=%000

Three bits are used for the host system software to assign the Queue 1 Pause Interrupt and Queue 1 Completion Interrupt to one of seven interrupt levels. The 000 state disables the interrupt. Level 001 is the lowest priority interrupt level, and level 111 is the highest. The QADC uses the level number to determine which of seven interrupt requests to the host CPU is to be asserted. The host CPU permits the interrupt to occur when there are no other interrupts at a higher level. Up to 15 different interrupts can be assigned by the host system software to a particular interrupt level, provided that each is assigned a unique interrupt priority.

IRL2—Interrupt Level 2 (Bit Position: 8-10)
Function: Define Queue 2 interrupt level
Reset State: IRL2=%000

Three bits are used for the host system software to assign the Queue 2 Pause Interrupt and Queue 2 Completion Interrupt to one of seven interrupt levels. The 000 state disables the interrupt. Level 001 is the lowest priority interrupt level, and level 111 is the highest. The QADC uses the level number to determine which of seven interrupt requests to the host CPU is to be asserted. The host CPU permits the interrupt to occur when there are no other interrupts at a higher level. Up to 15 different interrupts can be assigned by the host system software to a particular interrupt level, provided that each is assigned a unique interrupt priority.

IVB—Interrupt Vector Base Number (Bit Position: 2-7)
Function: Define interrupt vector base number
Reset State: %000011

The Interrupt Vector Base Number is established by the host system software. The QADC uses four interrupt vectors, two for each of the CCW queues. Therefore, the host system software writes the six high order bits of the Interrupt Vector Base Number into the QADC Interrupt Register. The QADC provides the two low order bits back to the host CPU during a bus IACK (interrupt acknowledge) cycle.

An interrupt from CCW Queue 1 completion returns an interrupt vector of binary xxxx xx11, where xxxx xx is the IVB field. An interrupt from CCW Queue 1 pause returns an interrupt vector of binary xxxx xx10, where xxxx xx is the IVB field. An interrupt from a CCW Queue 2 completion causes the returned vector to be xxxx xx01. An interrupt from a CCW Queue 2 pause causes the returned vector to be xxxx xx00. The vector number identifies the place in memory where the host CPU obtains the program counter for the interrupt routine. The Interrupt Vector Base Number is independent of the interrupt level and arbitration priority.

Port Data Register

All QADC pins that are not needed for their analog inputs, external trigger inputs, or external multiplexer interfacing, can also be used as digital port pins. The following descriptions refer to the highest pin-count version of the module, operating without external multiplexing. With the versions that implement fewer pins, the full width of the digital ports is not available.

Figure 15:
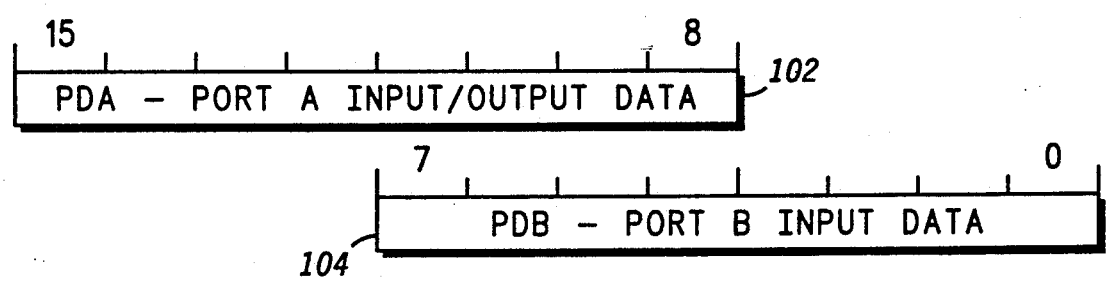
FIG. 15 shows the formats of the Port A and Port B Data Registers of the A/D converter module.

FIG. 15 shows the formats of the 8-bit Port A and Port B Data Registers of the QADC module 1.

Port A Data Registers (Bit Position: 8-15)
Function: Input/output data register

Port A is a bi-directional 8-bit I/O port that may be used for general purpose digital input or output signals.

Port B Data Register (Bit Position: 0-7)
Function: Input data register

Port B is an input-only 8-bit digital port that may be used for general purpose digital input signals.

Port Data Direction Registers

The Data Direction Register (DDR) associated with a digital I/O port establishes whether each bi-directional pin is an input or an output.

Figure 16:
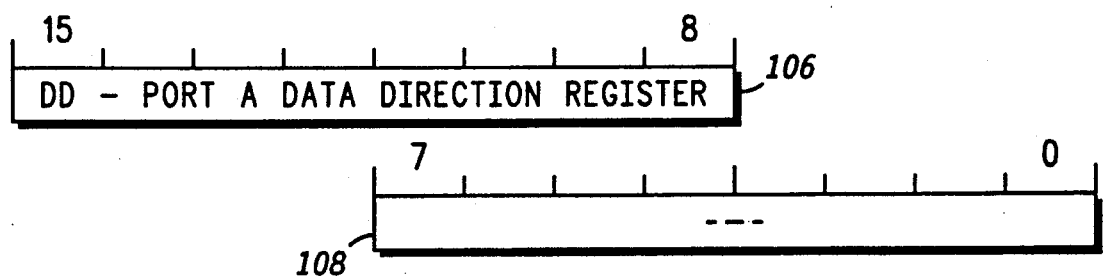
FIG. 16 shows the format of the Port A Data Direction Register of the A/D converter module.

FIG. 16 shows the format of the Port A Data Direction Register of the QADC module 1.

Port A Data Direction Register (Bit Position: 8-15)
Function: Establish Port A pin functions as input or output
Reset State: $00

In the maximum pin-count configuration, all eight bits of Port A are bi-directional. The Data Direction Register bits associated with each pin establish whether the pin handles an input or an output signal. On power-up, the Data Direction Register is reset, and all port pins are inputs. The host system software selects a pin to be a driven output signal by writing a binary one into the Data Direction bit for the pin. When the DDR establishes a pin to be an output, a host system software read of the Port A Data Register obtains the state of the output port data register, not the actual pin, in order to permit read-modify-write instructions.

Control Register 1

Figure 18:
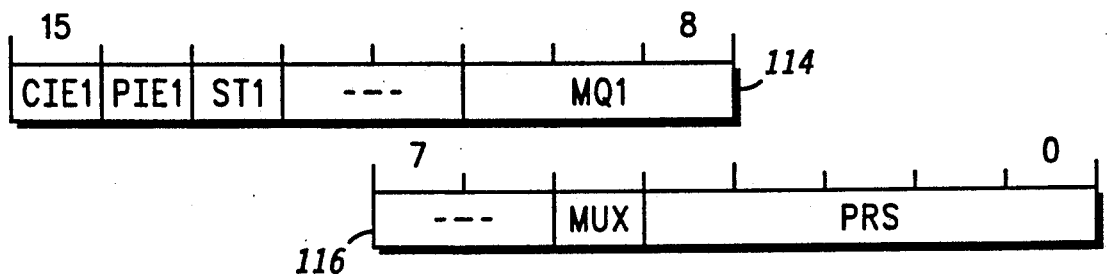
FIG. 18 shows the format of Control Register 1 of the A/D converter module.

FIG. 18 shows the format of Control Register 1 of the QADC module 1.

Control Register 1 is the Mode Control Register for the operation of Queue 1. The host system software establishes the operating mode of the queue servicing logic. One key purpose is to establish the criteria for beginning a conversion sequence with the first CCW in the queue. Control Register 1 allows the host system software to enable a Conversion Complete Interrupt and/or a Pause Interrupt. Control Register 1 also allows the host system software to establish the QADC clock rate.

CIE1—Completion Interrupt Enable 1 (Bit Position: 15)
Function: Enable interrupt upon completion of Queue 1
Reset State: %0

CIE1=0 disables the Conversion Complete Interrupt associated with Queue 1. CIE1=1 enables an interrupt after the last conversion of a Queue 1 CCW sequence. The last conversion in the sequence is identified when the CCW pointer is at the beginning of Queue 2, an end-of-queue code is encountered in the CHAN field of the CCW, or the end of the queue RAM is reached.

PIE1—Pause Interrupt Enable 1 (Bit Position: 14)
Function: Enable interrupt when Queue 1 enters pause state
Reset State: %0

PIE1=0 disables the Pause Interrupt associated with Queue 1. PIE1=1 enables an interrupt after the conversion of the sample requested by a CCW in Queue 1 which has the Pause bit asserted.

ST1—Start Bit for Queue 1 (Bit Position: 14)
Function: Enable a single scan of Queue 1 to start when the trigger condition occurs
Reset State: %0

When one of the single-scan modes is selected for Queue 1, the software enables the queue to begin execution by writing the Start bit (ST1) to one. Until the Start bit is set, any Queue 1 trigger conditions are ignored. The ST1 bit may be set to a one during the same write cycle when the MQ1 bits (discussed herein below) are set for one of the single-scan modes.

After the Start bit is set, a trigger condition causes the QADC to begin execution with the first CCW in Queue 1. The Start bit can be written as a one or a zero, but is always read as a zero. The only condition that is recognized by the QADC is the action of writing the Start bit to a one while the queue is in one of the single-scan modes. The fact that the Start bit was written to a one is remembered until the trigger condition of the chosen mode is recognized. In the software initiated single-scan mode, the writing of a one to the ST1 bit is the trigger condition.

When the Start bit is again written to a one before the Queue Completion flag is set, no action is taken. A new Start bit is not recognized until the previous scan reaches the end of the queue. Write operations to the ST1 bit are ignored when Queue 1 is not in a single-scan mode.

When a Pause bit is encountered during a scan in one of the single-scan modes, the software need not initiate another Start bit. The next trigger condition causes queue execution to continue from the pause state. After the queue reaches completion, setting the Start bit enables another single-scan of Queue 1.

MQ1—Mode, Queue 1 (Bit Position: 8-10)
Function: Select the operating mode for Queue 1
Reset State: %000

The three Mode bits (MQ1) in Control Register 1 establish the operating mode of Queue 1. The Mode bits are written to Control Register 1 by the host system software and are not modified by the QADC 1.

When there are active CCWs in Queue 1 awaiting service by the analog subsystem (sample and hold, and A/D converter), they have priority over any pending CCWs in Queue 2. The mode selected for MQ1 and the channels assigned to Queue 1 are thus the high priority A/D conversions. Therefore, if the continuous scanning mode is selected for Queue 1, the operation of Queue 2 is blocked.

The following summarizes the operating modes of Queue 1:

MQ1=000 Disabled, no conversions
MQ1=001 Software initiated, single-scan (started with ST1)
MQ1=010 External trigger, rising edge on ETRIG1 pin starts conversion sequence, single-scan
MQ1=011 External trigger, falling edge on ETRIG1 pin starts conversion sequence, single-scan
MQ1=100 Reserved
MQ1=101 Continuous scanning
MQ1=110 External trigger, rising edge on ETRIG1 pin starts conversion sequence, continuously enabled
MQ1=111 External trigger, falling edge on ETRIG1 pin starts conversion sequence, continuously enabled The software initiated single-scan mode allows the software to cause Queue 1 to be scanned once, and only once. The software sets the Start bit (ST1) to begin executing the first CCW. When the end of Queue 1 is reached, the execution of Queue 1 stops. The software can then set the Start bit again to cause one more scan to be executed, starting from the top of the queue.

Any CCW Pause bits that are encountered while Queue 1 is in the software initiated single-scan mode do not cause queue execution to pause; however, the Pause flag is set, which may initiate an interrupt. In the software initiated single-scan mode, each scan of the Queue 1 CCWs is initiated with a software command.

There are two external trigger single-scan modes. The two external trigger single-scan modes differ from each other only in that the first mode triggers when a rising edge is detected on the ETRIG1 pin, and the other mode triggers when a falling edge is detected on the ETRIG1 pin. The first trigger condition after the Start bit (ST1) is set causes Queue 1 to be executed until a Pause bit or the end of queue is encountered.

If a Pause bit is encountered while QADC 1 is in an external trigger single-scan mode, the next external trigger causes the scan to continue with the CCW following the Pause bit. In the case where the previous execution reached the end of the queue, after the start bit is set again, the next trigger causes Queue 1 execution to proceed with one more scan. All triggers are ignored which occur after the Completion flag is set and before the Start bit is set again.

In the continuous scanning mode, Queue 1 is scanned continuously. As soon as the end of the queue is reached, it starts over at the top. All of the conversions are pipelined, except for the first CCW in the queue. One scan must be fully complete, as indicated by the Completion flag, before sampling begins again for the first CCW.

If a Pause bit is encountered while QADC 1 is in the continuous scanning mode, queue execution continues with the next CCW. However, a CCW Pause bit causes the Pause flag in the Status Register (discussed herein below) to be set. The pause feature is a useful way to notify the software that a portion of the scan is complete. For example, the Pause flag can be used to indicate that the continuous scan is halfway through the queue, while the Completion flag shows when the latter half of the Result Table is full.

When Queue 1 is in the continuous scanning mode, the A/D converter is sampling and making conversions full time, which means that Queue 2 can never be served. The Queue 1 continuous scanning mode devotes the QADC solely to Queue 1. If the software has selected an operating mode for Queue 2 while Queue 1 is in the continuous scanning mode, Queue 2 does not get scanned.

There are also two external trigger continuous modes. The two external trigger continuous modes differ from each other only in that the first mode triggers when a rising edge is detected on the ETRIG1 pin, and the other mode triggers when a falling edge is detected on the ETRIG1 pin. The Start bit is not used for these external trigger continuous modes. Software involvement is not needed to operate the queue. Each time a trigger is detected, a scan is begun. The scan of CCWs is stopped when either a Pause bit or the end of queue is encountered. When the previous scan completes at the end of the queue, a new scan begins at the beginning of the queue. When the previous scan ends with a CCW containing a Pause bit, the new scan begins with the next CCW following the CCW containing the Pause bit.

MUX—External Multiplexed Mode (Bit Position: 5)
Function: Select multiplexed mode or non-multiplexed mode for channel numbering
Reset State: %0

The host system software can enable an expansion of the number of channels by setting the MUX mode. When MUX=0, the non-multiplexed mode (also called internally multiplexed mode) is selected and there is no external multiplexing being performed. Note, however, that internal multiplexing still occurs even in non-multiplexed mode. When MUX=0, a maximum of 16 external channels are available. When MUX=1, the multiplexed mode (also called external multiplexed mode) is selected and external multiplexing is now performed. When MUX=1, up to 44 external channels can be supported by using up to four external multiplexer chips.

In the external multiplexed mode, there are three multiplexed address output pins MA2, MA1, and MA0. In some microcomputer implementations, these multiplexed address output pins are three dedicated pins. However, in most microcomputer implementations, the QAA2, QAA1, and QAA0 pins are used as the MA2, MA1, and MA0 multiplexed address output pins, respectively.

In the external multiplexed mode, the QAB3, QAB2, QAB1, and QAB0 pins are used as the multiplexed analog input pins ANz, ANy, ANx, and ANw, respectively.

The following table illustrates the two states of the MUX field:
MUX=0 Internally multiplexed, 16 possible channels
MUX=1 Externally multiplexed, 44 possible channels
PRS—Prescalar (Bit Position: 0-4)
Function: Establish Intermodule Bus system clock to QADC clock ratio
Reset State: %00011

The QADC clock is the time base for all analog conversion functions, including the input sample time, the conversion time, and the periodic timer. The prescalar (prescalar 50 in FIG. 2) divides the Intermodule Bus system clock to produce the QADC clock. The prescalar must be software programmed so that its output frequency falls within the specified tolerance. To permit wide selection of the system clock frequencies, the QADC prescalar is modulus programmable. A five-bit modulus prescalar, followed by a divide-by-two stage, divides the Intermodule Bus system clock frequency by a range of 2 to 64, in even integer increments.

Control Register 2

Figure 19:
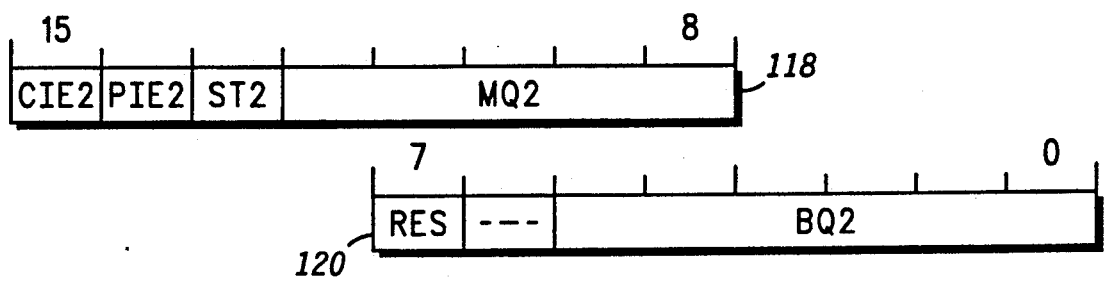
FIG. 19 shows the format of Control Register 2 of the A/D converter module.

FIG. 19 shows the format of Control Register 2 of the QADC module 1.

Control Register 2 is the Mode Control Register for the operation of the CCWs in Queue 2. The host system software establishes the operating mode of the queue servicing logic, that is, the criteria for beginning a conversion sequence with the first CCW in Queue 2. The first conversion can be initiated by host system software command, at regularly timed intervals, immediately after the last sequence is completed (the continuous mode), or when an external trigger occurs. Control Register 2 also allows the host system software to enable Conversion Completion Interrupts and Pause Interrupts.

CIE2—Completion Interrupt Enable 2 (Bit Position: 15)

Function: Enable interrupt upon completion of Queue 2

Reset State: %0

CIE2=0 disables the Conversion Complete Interrupt associated with Queue 2. CIE2=1 enables an interrupt after the last conversion of a Queue 2 CCW sequence. The last conversion in the sequence is identified when the CCW index pointer is at the last location of the table or the CCW CHAN field is the end-of-queue code.

PIE2—Pause Interrupt Enable 2 (Bit Position: 14)

Function: Enable interrupt when Queue 2 enters pause state

Reset State: %0

PIE2=0 disables the Pause Interrupt associated with Queue 2. PIE2=1 enables an interrupt after the conversion of the sample requested by a CCW in Queue 2 which has the Pause bit asserted.

ST2—Start Bit for Queue 2 (Bit Position: 14)

Function: Enable a single scan of Queue 2 to start when the trigger condition occurs Reset State: %0

When one of the single-scan modes is selected for Queue 2, the software enables the queue to begin execution by writing the Start bit (ST2) to one. Until the Start bit is set, any Queue 2 trigger conditions are ignored. The ST2 bit may be set to a one during the same write cycle when the MQ2 bits (discussed herein below) are set for one of the single-scan modes.

After the Start bit is set, a trigger condition causes the QADC to begin execution with the first CCW in Queue 2. The Start bit can be written as a one or a zero, but is always read as a zero. The only condition that is recognized by the QADC is the action of writing the Start bit to a one while the queue is in one of the single-scan modes. The fact that the Start bit was written to a one is remembered until the trigger condition of the chosen mode is recognized. In the software initiated single-scan mode, the writing of a one to the ST2 bit is the trigger condition.

When the Start bit is again written to a one before the Queue Completion flag is set, no action is taken. A new Start bit is not recognized until the previous scan reaches the end of the queue. Write operations to the ST2 bit are ignored when Queue 2 is not in a single-scan mode.

When a Pause bit is encountered during a scan in one of the single-scan modes, the software need not initiate another Start bit. The next trigger condition causes queue execution to continue from the pause state. After the queue reaches completion, setting the Start bit enables another single-scan of Queue 2.

MQ2—Queue 2 Operation Mode (Bit Position: 8-12)

Function: Select the operating mode for Queue 2

Reset State: %00000

The five Mode bits (MQ2) in Control Register 2 establish the operating mode of Queue 2. The Mode bits are written to Control Register 2 by the host system software and are not modified by the QADC 1.

The mode selected for MQ1 and the channels assigned to Queue 1 are the high priority A/D conversions. Queue 2 is intended for lower priority analog conversions. When there are active CCWs in Queue 1 awaiting service by the analog subsystem (sample and hold, and A/D converter), they have priority over any pending CCWs in Queue 2. When Queue 1 is enabled and the selected Queue 1 trigger condition occurs, Queue 2 execution is suspended. When the higher priority Queue 1 conversions are finished, either the CF1 or the PF1 flag (discussed herein below) is set and the QADC resumes servicing Queue 2. Depending on the encoding of the Resume bit (RES) for Queue 2, the QADC resumes servicing Queue 2 by restarting the aborted CCW, by beginning over with the first CCW in Queue 2, or by beginning with the CCW after the last pause.

When there are active CCWs in Queue 1 awaiting service by the analog subsystem (sample and hold, and A/D converter), they have priority over any pending CCWs in Queue 2. The mode selected and the channels assigned to Queue 2 should thus be the lower priority A/D conversions.

With prior art A/D converters integrated into microcontroller units, a common software usage is for a periodic interrupt (real-time clock interrupt) routine to initiate an A/D conversion sequence. The QADC 1 includes a periodic timer to keep the host system software from having to initiate a conversion scan. The MQ2 field selects the time interval.

The following table summarizes the operating modes of Queue 2:

| MQ2 | |
| --- | --- |
| 00000 | Disabled, no conversions |
| 00001 | Software initiated, single-scan (started with ST2) |
| 00010 | External trigger, rising edge on ETRIG2 pin starts conversion sequence, single-scan |
| 00011 | External trigger, falling edge on ETRIG2 pin starts conversion sequence, single-scan |
| 00100 | Single-scan after: time interval = QADC Clock Period × 128 |
| 00101 | Single-scan after: time interval = QADC Clock Period × 256 |
| 00110 | Single-scan after: time interval = QADC Clock Period × 512 |
| 00111 | Single-scan after: time interval = QADC Clock Period × 1024 |
| 01000 | Single-scan after: time interval = QADC Clock Period × 2048 |
| 01001 | Single-scan after: time interval = QADC Clock Period × 4096 |
| 01010 | Single-scan after: time interval = QADC Clock Period × 8192 |
| 01011 | Single-scan after: time interval = QADC Clock Period × 16384 |
| 01100 | Single-scan after: time interval = QADC Clock Period × 32768 |
| 01101 | Single-scan after: time interval = QADC Clock Period × 65536 |
| 01110 | Single-scan after: time interval = QADC Clock Period × 131072 |
| 01111 | Reserved |
| 10000 | Reserved |
| 10001 | Continuous scanning |
| 10010 | External trigger, rising edge on ETRIG2 pin starts conversion sequence, continuously enabled |
| 10011 | External trigger, rising edge on ETRIG2 pin starts conversion sequence, continuously enabled |
| 10100 | Periodic timer: interval = QADC Clock Period × 128 |
| 10101 | Periodic timer: interval = QADC Clock Period × 256 |
| 10110 | Periodic timer: interval = QADC Clock Period × 512 |
| 10111 | Periodic timer: interval = QADC Clock Period × 1024 |
| 11000 | Periodic timer: interval = QADC Clock Period × 2048 |
| 11001 | Periodic timer: interval = QADC Clock Period × 4096 |
| 11010 | Periodic timer: interval = QADC Clock Period × 8192 |
| 11011 | Periodic timer: interval = QADC Clock Period × 16384 |
| 11100 | Periodic timer: interval = QADC Clock Period × 32768 |

| -continued | |
|---|---|
| MQ2 | |
| 11101 | Periodic timer:<br>interval = QADC Clock Period × 65536 |
| 11110 | Periodic timer:<br>interval = QADC Clock Period × 131072 |
| 11111 | Reserved |

The various operating modes of Queue 2, as selected by the MQ2 bits, will now be discussed.

The software initiated single-scan mode allows the software to cause Queue 2 to be scanned once, and only once. The software sets the Start bit (ST2) to begin executing the first CCW. When the end of Queue 2 is reached, the execution of Queue 2 stops. The software can then set the Start bit again to cause one more scan to be executed, starting from the top of the queue.

Any CCW Pause bits that are encountered while Queue 2 is in the software initiated single-scan mode do not cause queue execution to pause; however, the Pause flag is set, which may initiate an interrupt. In the software initiated single-scan mode, each scan of the Queue 2 CCWs is initiated with a software command.

There are two external trigger sinle-scan modes. The two external trigger single-scan modes differ from each other only in that the first mode triggers when a rising edge is detected on the ETRIG2 pin, and the other mode triggers when a falling edge is detected on the ETRIG2 pin. The first trigger condition after the Start bit (ST2) is set causes Queue 2 to be executed until a Pause bit or the end of queue is encountered.

If a Pause bit is encountered while Queue 2 is in an external trigger single-scan mode, the next external trigger causes the scan to continue with the CCW following the Pause bit. In the case where the previous execution reached the end of the queue, after the start bit is set again, the next trigger causes Queue 2 execution to proceed with one more scan. All triggers are ignored which occur after the Completion flag is set and before the Start bit is set again.

There are eleven single-scan time interval modes, each with a different delay time. The time interval is counted from when the Start bit (ST2) is set. When the time interval expires, the Queue 2 scan is executed. When the end of the queue is reached, or a Pause bit is encountered, Queue 2 stops. If the previous scan ended in the pause state, when the time interval expires again, Queue 2 execution continues with the CCW following the Pause bit. If the previous scan ended with an end of queue indication, Queue 2 execution begins again with the first CCW in Queue 2 when the Start bit is set again and the time interval is measured again.

In the continuous scanning mode, Queue 2 is scanned continuously. As soon as the end of the queue is reached, it starts over at the top. All of the conversions are pipelined, except for the first CCW in the queue. One scan must be fully complete, as indicated by the Completion flag, before sampling begins again for the first CCW.

If a Pause bit is encountered while QADC 1 is in the continuous scanning mode, queue execution continues with the next CCW. However, a CCW Pause bit causes the Pause flag in the Status Register (discussed herein below) to be set. The pause feature is a useful way to notify the software that a portion of the scan is complete. For example, the Pause flag can be used to indicate that the continuous scan is halfway through the queue, while the Completion flag shows when the latter half of the Result Table is full.

There are also two external trigger continuous modes. The two external trigger continuous modes differ from each other only in that the first mode triggers when a rising edge is detected on the ETRIG2 pin, and the other mode triggers when a falling edge is detected on the ETRIG2 pin. The Start bit is not used for these external trigger continuous modes. Software involvement is not needed to operate the queue. Each time a trigger is detected, a scan is begun. The scan of CCWs is stopped when either a Pause bit or the end of queue is encountered. When the previous scan completes at the end of the queue, a new scan begins at the beginning of the queue. When the previous scan ends with a CCW containing a Pause bit, the new scan begins with the next CCW following the CCW containing the Pause bit.

There are eleven periodic timer modes, each with a different time interval. Each time the interval expires, the Queue 2 scan is executed. When the end of the queue is reached, or a Pause bit is encountered, Queue 2 stops. The periodic timer continues to run, and when the interval is again reached, Queue 2 is scanned again. When the previous scan ended in the pause state, Queue 2 execution resumes with the CCW following the Pause bit. When the previous scan ended with an end of queue indication, Queue 2 execution resumes with the first CCW in Queue 2.

RES—Queue 2 Resume (Bit Position: 7)
Function: Select Queue 2 resumption point after suspension due to Queue 1
Reset State: %0
The Resume bit is used to determine which CCW to execute next in Queue 2 when Queue 2 execution begins again after being previously suspended by Queue 1. RES=0 begins execution, after suspension, with the first CCW in Queue 2 or the CCW after the most recent pause. RES=1 begins execution, after suspension, with the aborted CCW in Queue 2.

BQ2—Beginning of Queue 2 (Bit Position: 0–5)
Function: Indicates the CCW address where Queue 2 begins
Reset State: %100111—last valid address
To allow the length of Queue 1 and Queue 2 to vary, a pointer initialized by the host system software is used to identify the CCW table location where Queue 2 begins. BQ2 is used to detect the end of Queue 1, as well as the initial position for Queue 2. When BQ2=101000 or greater, Queue 2 has no entries, the entire queue is devoted to Queue 1. When BQ2=000000, the entire queue space is dedicated to Queue 2. It would be a software error, but if a Queue 1 operating mode is selected and triggered when BQ2=000000, no Queue 1 conversions would occur.

Status Register

The Status Register may be read by the host system software and contains information associated with the conversion queues and the overall QADC module.

Figure 20:
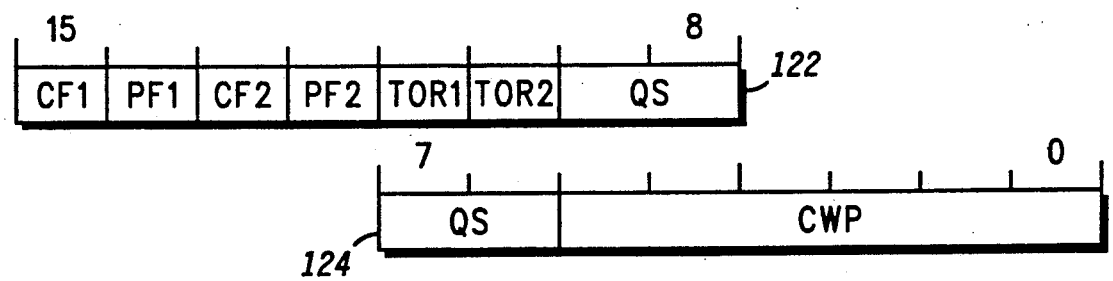
FIG. 20 shows the format of the Status Register of the A/D converter module.

FIG. 20 shows the format of the Status Register of the QADC module 1.

CF1—Queue 1 Completion Flag (Bit Position: 15)
Function: Indicates Queue 1 scan has completed
Reset State: %0
The Queue 1 Completion flag is set by the QADC when the last conversion of Queue 1 is finished. The end of Queue 1 is identified when execution is complete on the CCW in the location prior to that pointed to by BQ2, when the current CCW contains an end of queue code instead of a valid channel number, or when the currently completed CCW is in the last location of the CCW RAM. If CF1=0, the Queue 1 scan is not complete. If CF1=1, the Queue 1 scan is complete.

CF1 is a status bit that is available to the host system software whether or not the corresponding interrupt is enabled. When CF1=1 and the interrupt is enabled (CIE1=1), the QADC 1 creates an interrupt request to the host CPU using the level (IRL1) in the Interrupt Register, the priority (IARB) in the Module Configuration Register, and the vector base number (IVB) in the Interrupt Register. The CF1 flag is cleared back to zero when it is written to zero and it was a one when last read.

PF1—Queue 1 Pause Flag (Bit Position: 14)
Function: Indicates Queue 1 scan has reached a pause
Reset State: %0

The Queue 1 Pause flag is set by the QADC when the current Queue 1 CCW has the Pause bit set, the selected input channel has been converted, and the result has been stored in the Result Table. The Queue 1 Pause flag is maintained by the QADC regardless of whether the corresponding interrupt is enabled. The software may poll for the PF1 flag to be set in order to determine when the QADC has reached a pause in scanning Queue 1. The software acknowledges that it has detected PF1 being set by writing a zero to PF1 after the bit was last read as a one.

When the PF1 flag is set and interrupts are enabled for the Queue 1 Pause flag (PIE1=1), the QADC asserts an interrupt request at the level specified by IRL1 in the interrupt register. The software may read the PF1 flag during an interrupt service routine to identify the interrupt request. The interrupt request is cleared by the software writing a zero to the PF1 flag, when the previous time the bit was read, it was a one. PF1=0 indicates that Queue 1 has not reached a pause. PF1=1 indicates that Queue 1 has reached a pause.

CF2—Queue 2 Completion Flag (Bit Position: 13)
Function: Indicates Queue 2 scan has completed
Reset State: %0

The Queue 2 Completion flag is set by the QADC when the last conversion of Queue 2 is finished. The end of Queue 2 is identified when the current CCW contains an end of queue code instead of a valid channel number, or when the currently completed CCW is in the last location of the CCW RAM. If CF2=0, the Queue 2 scan is not complete. If CF2=1, the Queue 2 scan is complete.

CF2 is a status bit that is available to the host system software whether or not the corresponding interrupt is enabled. When CF2=1 and the interrupt is enabled (CIE2=1), the QADC 1 creates an interrupt request to the host CPU using the level (IRL2) in the Interrupt Register, the priority (IARB) in the Module Configuration Register, and the vector base number (IVB) in the Interrupt Register. The CF2 flag is cleared back to zero when it is written to zero and it was a one when last read.

PF2—Queue 2 Pause Flag (Bit Position: 12)
Function: Indicates Queue 2 scan has reached a pause
Reset State: %0

The Queue 2 Pause flag is set by the QADC when the current Queue 2 CCW has the Pause bit set, the selected input channel has been converted, and the result has been stored in the Result Table. The Queue 2 Pause flag is maintained by the QADC regardless of whether the corresponding interrupt is enabled. The software may poll for the PF2 flag to be set in order to determine when the QADC has reached a pause in scanning Queue 2. The software acknowledges that it has detected PF2 being set by writing a zero to PF2 after the bit was last read as a one.

When the PF2 flag is set and interrupts are enabled for the Queue 2 Pause flag (PIE2=1), the QADC asserts an interrupt request at the level specified by IRL2 in the interrupt register. The software may read the PF2 flag during an interrupt service routine to identify the interrupt request. The interrupt request is cleared by the software writing a zero to the PF2 flag, when the previous time the bit was read, it was a one. PF2=0 indicates that Queue 2 has not reached a pause. PF2=1 indicates that Queue 2 has reached a pause.

TOR1—Queue 1 Trigger Overrun (Bit Position: 11)
Function: Indicates that an unexpected trigger has been received for Queue 1
Reset State: %0

TOR1=0 indicates that no unexpected Queue 1 triggers have occurred. TOR1=1 indicates that at least one unexpected Queue 1 trigger has occurred. An external trigger and a software initiated trigger are considered to be trigger conditions that initiate Queue 1 execution. After Queue 1 has been triggered and before the scan has completed or paused, additional triggers are not retained and are considered unexpected. Since queue execution is already in progress, the QADC sets the TOR1 error status bit. Software initiated triggers do not cause trigger overruns.

An unexpected trigger may be an overrun situation, indicating a system loading mismatch. The software acknowledges that it has detected TOR1 being set by writing a zero to TOR1, after the bit was last read as a one. TOR1 is cleared in this manner.

TOR2—Queue 2 Trigger Overrun (Bit Position: 10)
Function: Indicates that an unexpected trigger has been received for Queue 2
Reset State: %0

TOR2=0 indicates that no unexpected Queue 2 triggers have occurred. TOR2=1 indicates that at least one unexpected Queue 2 trigger has occurred. An external trigger, a software initiated trigger, and a timer initiated trigger are considered to be trigger conditions that initiate Queue 2 execution. After Queue 2 has been triggered and before the scan has completed or paused, additional triggers are not retained and are considered unexpected. Since queue execution is already in progress, the QADC sets the TOR2 error status bit. Software initiated triggers do not cause trigger overruns.

An unexpected trigger may be an overrun situation, indicating a system loading mismatch. The software acknowledges that it has detected TOR2 being set by writing a zero to TOR2, after the bit was last read as a one. TOR2 is cleared in this manner.

OS—Queue Status (Bit Position: 6-9)
Function: Indicates the status of Queue 1 and Queue 2
Reset State: %0000

A four-bit read-only status field is available to the host system software to indicate the current condition of the two queues. Two of the bits are associated primarily with Queue 1, and two of the bits are associated primarily with Queue 2. Since the priority scheme between the two queues causes the status of the two queues to be interlinked, the status of the two queues is shown as one four-bit field. The active state of either queue occurs when a CCW is in the process of being executed for that queue. Only one queue can be active at a time.

Either queue can be in the pause state, which occurs when the last CCW to be executed by that queue terminates by setting the Pause flag. When either queue is idle, CCWs are not being executed, the queue is not in the pause mode, and there are no trigger conditions pending.

Queue 2 is considered to be suspended when Queue 1 becomes active by aborting a CCW execution in Queue 2. Queue 2 has a trigger pending when Queue 1 is active and a trigger condition is recognized for Queue 2, but Queue 2 cannot begin execution until Queue 1 is finished.

The following summarizes the status conditions of Queue 1 and Queue 2:

| QS | |
|---|---|
| 0000 | Queue 1 is idle, Queue 2 is idle |
| 0001 | Queue 1 is idle, Queue 2 has paused |
| 0010 | Queue 1 is idle, Queue 2 is active |
| 0011 | Reserved |
| 0100 | Queue 1 has paused, Queue 2 is idle |
| 0101 | Queue 1 has paused, Queue 2 has paused |
| 0110 | Queue 1 has paused, Queue 2 is active |
| 0111 | Reserved |
| 1000 | Queue 1 is active, Queue 2 is idle |
| 1001 | Queue 1 is active, Queue 2 has paused |
| 1010 | Queue 1 is active, Queue 2 is suspended |
| 1011 | Reserved |
| 1100 | Queue 1 is active, Queue 2 is idle and with a trigger pending |
| 1101 | Queue 1 is active, Queue 2 has paused and with a trigger pending |
| 1110 | Reserved |
| 1111 | Reserved |

CWP—Command Word Pointer (Bit Position: 0-5)
Function: Indicates the address location of the current or last CCW to execute
Reset State: %000000

The Conversion Command Word (CCW) table length is 40 words long. A six-bit status field is included to allow the host system software to see which CCW is executing at present or was last completed. The host system software can thus monitor progress of a conversion sequence. When the converter is busy, the CWP shows the CCW presently being served. When not busy, the CWP indicates the last CCW that was completed. The CWP is a software read-only field. Write operations to the CWP status field have no effect.

Conversion Command Word

The Conversion Command Word (CCW) Table is used to determine characteristics of individual conversions within a queue. In the present embodiment, the CCW Table is implemented as a random access memory (RAM) which is forty words long and ten bits wide. Each of the forty entries in the CCW Table is a ten-bit Conversion Command Word (CCW). The CCW is written by the host system software and is not modified by the QADC. Each CCW contains the command bits to take one analog level sample and convert it to a digital result. Each CCW also contains one or more command bits, such as Pause, to indicate when the next subsequent CCW is to be read and executed.

FIG. 7 shows the format of each Conversion Command Word (CCW) in the Conversion Command Word Table of the QADC module 1. There are presently three fields implemented within each CCW: P, IST, and CHAN. The P field determines whether or not the queue will enter the pause state after completing the conversion called for by that particular CCW. The IST and CHAN fields contain command information for the sample and hold portion of the A/D converter for that particular CCW. The fields of the CCW will now be explained.

P—Pause (Bit Position: 9)
Function: Enter pause state after completion of the current conversion
Reset State: Not initialized The Pause bit allows software to create sub-queues of A/D conversions within Queue 1 and Queue 2. The QADC first performs the conversion specified by the CCW. And only after the conversion specified by the CCW has been completed does the Pause bit take effect. If P=0, the queue does not enter the pause state after execution of the present CCW. If P=1, the queue enters the pause state after execution of the present CCW.

The Pause bit is used by the internal circuitry of the QADC 1 as a control bit to control the execution flow of the control circuitry.

The Pause bit can be used to define multiple sub-queues of A/D conversions within a queue. The present invention allows the user to define multiple sub-queues of A/D conversions without requiring the use of interrupts. The Pause bit can be used to mark the end of a sub-queue. Once a Pause bit is encountered, the queue enters a pause state and the scanning of CCWs is stopped. A trigger is then required in order for the scanning of CCWs to begin again.

In the software initiated single-scan mode and the continuous scanning mode, the queue is automatically triggered so that conversions continue beyond the CCW that has its Pause bit set. To the user of the QADC module 1, the Pause bit appears to have no effect other than setting the Pause flag. However, the QADC 1 circuitry may or may not briefly enter the pause state.

IST—Input Sample Time (Bit Position: 6-8)
Function: Selects one of eight input sample times
Reset State: Not initialized The IST field in the CCW allows software to specify the duration of the sample time for the input channel. To select the shortest input sample time, the IST bits in the CCW are programmed to %001. When longer sample times are needed, the IST bits in the CCW are programmed to select a sample time ranging from 12 to 64 QADC clocks. A longer sample time is required to ensure conversion accuracy for channels connected to signals with a high source impedance. Another purpose for a longer sample time is to establish a longer time interval between conversions within a queue.

In normal operation, two adjacent channels are sampled simultaneously by two separate sample amplifiers, but only the one indicated by the CCW channel field (CHAN) is converted. In order to convert the simultaneously sampled data from the adjacent channel, the software may program the IST field in the next CCW to %000. The resample inhibit IST encoding selects the adjacent channel for conversion regardless of the content of the channel field (CHAN), except when the CHAN field contains the end of queue code. Also, the IST field has no meaning when the internal channels are selected.

It would be a software error for the resample inhibit to be specified in more than one consecutive CCW, but should it occur, the charge that currently appears on the selected sample amplifier is converted. It would also be a software error for the first CCW in a scan to have the IST field programmed for resample inhibit, either at the top of the queue or after a pause; but should that occur, the indeterminate charge stored in the sample amplifier is converted.

The following summarizes the sample times available for the input channel:

| IST | |
|---|---|
| 000 | Resample inhibit -- Convert previous simultaneous sample |
| 001 | Input sample time = QADC Clock Period × 4 |
| 010 | Input sample time = QADC Clock Period × 12 |
| 011 | Input sample time = QADC Clock Period × 16 |
| 100 | Input sample time = QADC Clock Period × 24 |
| 101 | Input sample time = QADC Clock Period × 32 |
| 110 | Input sample time = QADC Clock Period × 48 |
| 111 | Input sample time = QADC Clock Period × 64 |

CHAN—Channel Number (Bit Positions 0-5)
Function: Select input channel number
Reset State: Not initialized The CHAN bits select which analog input signal is connected to the A/D converter. When the QADC module is in the internally multiplexed mode, the six CHAN bits enable the QADC to select up to 16 input channels, depending on the module version, plus internal test channels, as shown in FIG. 9. For micro-controller implementations with fewer than 16 external pins, the unconnected pins are connected internally to a predetermined voltage level.

When the externally multiplexed mode is in use, the six CHAN bits are re-mapped so that some of the channel numbers are externally multiplexed. The table in FIG. 9 shows the definition for the CHAN channel numbers for the external multiplexing mode.

One of the CHAN words (CHAN=%111111) is used as an end-of-queue indication instead of a multiplexed input channel. When the control logic encounters this end-of-queue code in the CCW table, no further conversions are performed on that scan through the queue.

In addition, as mentioned above, the CCW may include one or more optional control fields if desired. For example, a field may specify the converter resolution if different converter resolutions need to be accommodated. Another field may be used to designate the data result alignment, rather than using the two upper address bits to select the data result alignment in the manner explained immediately below.

While it is a significant advantage of the present invention that sampling and conversion operations can be conducted, once the queues are loaded by the host system software, without further involvement by such software, it is also possible for the host system software to dynamically modify information stored in the queues. This would normally be done only to the lower priority queue (e.g. Queue 2), since the higher priority queue (Queue 1) is normally utilized for high duty cycle operations on relatively fast changing signals.

One purpose in modifying the Queue 2 control information is to designate the periodic sampling and conversion of analog signals which typically change relatively slowly compared to those being sampled and converted under the control of Queue 1.

Result Word Format Options

FIG. 21 illustrates the addresses required to read Result Words stored in the Conversion Result Table in at least three different data format options. In the illustrated addresses, "x" represents an arbitrary base address of the QADC module, and $0B0 through $1FE represent an offset from that base address. Note that the Conversion Result Table has only forty words of memory which are physically implemented as RSLT0 through RSLT39. These forty words of physical memory are then mapped three times into the address map as shown in FIG. 21. Thus three different addresses can be used to access each physical word of memory in the Conversion Result Table. Which of the three possible addresses is used to access a word in the Conversion Result Table determines the format in which the data is retrieved.

Referring to FIG. 11 and FIG. 21, the addresses are $x0B0, $x0B2, $xB4, etc., through $x0FE for the forty result words RSLT0 through RSLT39, respectively, in the right-justified, unsigned format. The addresses are $x130, $x132, etc., through $x17E for the forty result words RSLT0 through RSLT39, respectively, in the left-justified, signed format. And the addresses are $x1B0, $x1B2, etc., through $x1FE for the forty result words RSLT0 through RSLT39, respectively, in the left-justified, unsigned format.

In alternate embodiments of the present invention, the desired data result format may also be specified by host system software loading appropriate control information into the QADC module. For example, format information could be loaded (in the form of one or more bits in a CCW or control register) to specify the desired data result format for each conversion, for a scan sequence or group of conversions, for each channel (as one or more control register bits per pin), or for a group of channels.

Alternative Embodiments

It will be apparent to one of ordinary skill that the present invention can be implemented in many different ways.

For example, the system architecture could be arranged differently. The bus structure to the host processor could be different. The control word queues and result registers could be coupled to the host processor bus rather than associated with the QADC module.

The various control words, tables, and registers could contain more or fewer number of bits and data fields, and they could be arranged in many other ways. The register addresses and bit assignments could be altered.

The control fields can be implemented in different control words. For instance, the MUX field in Control Register 1 could be implemented elsewhere, such as the Module Configuration word in Module Configuration Register (FIG. 6).

The CCW table 62 could be a ROM (Read Only Memory). It could also be a single register storing a CCW containing control information to control the desired conversion process, e.g. all channels in a specified sequence.

The number of input analog pins could be fewer or more. The number of channels could be expanded by employing a larger channel field (CHAN) in the CCW. Pin assignments and functions and channel numbers (FIG. 9) could be altered.

The converter resolution could be selectable via a data field in a control word.

The queue lengths could be longer or shorter, and there could be more or fewer queues, including a queue only one CCW long. There could be more or fewer queue-initiating modes on each queue. There are a variety of ways for identifying the beginning and end of each queue.

There could be fewer or more data result formats, and, as mentioned above, there are a variety of other ways to select which data result format applies to each conversion, group of conversions, channel, or group of channels.

All of the conversion initiation methods (external trigger, periodic interval, continuous, software initiated), and most of the rest of the QADC features, can be applied to an A/D module that does not use a CCW queue to schedule the channels to be converted.

There can be more or less versatility regarding the selection of the input sample time.

There are other ways to convert two simultaneously sampled channels, and the selection of which channels and how many channels are to be sampled simultaneously can be more or less versatile.

There could be more than one reference high pin $V_{RH}$ and more than one reference low pin $V_{RL}$. Selection of which reference pins are to be used can be allowed via a data field in a control word.

The external trigger pins and external MUX interface pins could be separate or shared with the analog input signals. The MUX addressing signals need not necessarily be transmitted on pins also functioning as analog input channels.

The number of external multiplexers could be altered. Other variations to the module definition could affect the MUX function.

The channel selection need not be performed by a CCW in a queue. For example, a sequential scan of the channel numbers could also be used.

Control signals in addition to the MUX addressing signals used in the Queued A/D Converter module could also be used, such as an "enable" signal on an external MUX.

A different software interrupt structure could be used. For example, more or different status flags could be used which caused interrupts.

The clock source and prescaler selection could be more or less versatile.

The periodic timer rate selection could be more or less versatile, and there could be more than one selectable rate. Queue 1 may also have a periodic timer mode.

The external trigger could originate from another module of the same integrated circuit. It need not be an external pin.

The CCW (FIG. 7) could contain more or fewer parameters to specify the characteristics of each sample, hold, and conversion.

One or more bits in each CCW could be utilized to designate the data format. For example, bits could be provided for resolution (result size) or for result data format, such as left/right justification and signed/unsigned data.

Alternate methods, other than a Pause bit in a CCW, could be used to establish the boundary between sub-queues. For example, a sub-queue could have a fixed or variable number of CCWs. Alternatively, one or more sub-queue pointers could be used to point to sub-queue boundaries.

There are also alternate ways to initiate execution of each sub-queue. For example, multiple triggers could be encoded into one external trigger input signal. Alternatively, additional external trigger input pins could be used with different sub-queues utilizing different triggers.

The Pause bit may also be a field of more than one bit. For example, a multi-bit pause field could encode additional information such as the criteria expected for queue execution to continue, and/or the source of the trigger condition that will cause the queue to leave the pause state and begin execution again.

Accordingly, it is intended by the appended claims to cover all modifications of the invention which fall within the true spirit and scope of the invention.

We claim:

1. An analog-to-digital conversion system, comprising:
   at least one analog input terminal;
   storage circuitry for storing a first set of conversion command words and a second set of conversion command words, the first set of conversion command words including a first at least one conversion command word, and the second set of conversion command words including a second at least one conversion command word;
   accessing means for accessing the first set of conversion command words and for accessing the second set of conversion command words, said accessing means being coupled to said storage circuitry;
   sampling means responsive to the first at least one conversion command word for sampling an analog signal on said at least one analog input terminal and for providing a sampled value of the analog signal, said sampling means being coupled to said at least one analog input terminal and to said accessing means;
   an analog-to-digital converter, coupled to said sampling means, said analog-to-digital converter converting the sampled value of the analog signal into a digital value; and
   pause means for selectively inhibiting said accessing means from accessing one of the first set of conversion command words and the second set of conversion command words, said pause means being coupled to said accessing means.

2. An analog-to-digital conversion system as in claim 1, wherein the analog-to-digital conversion system further comprises:
   a trigger selection means for selecting one of a plurality of trigger signals, said trigger selection means being coupled to said pause means.

3. An analog-to-digital conversion system as in claim 1, wherein said pause means further comprises:
   a trigger input terminal for receiving a trigger signal; wherein said pause means stops inhibiting said accessing means when the trigger signal is asserted.

4. An analog-to-digital conversion system as in claim 2, wherein the analog-to-digital conversion system further comprises:
   trigger detection means for asserting the trigger signal in response to detecting a trigger condition, said trigger detection means being coupled to said trigger input terminal.

5. An analog-to-digital conversion system as in claim 1, wherein said analog-to-digital converter performs an analog-to-digital conversion responsive to the second at least one conversion command word while said pause means inhibits accesses to the first set of conversion command words.

6. An analog-to-digital conversion system as in claim 1, wherein the first at least one conversion command word includes a pause bit field for storing a first pause value, and the second at least one conversion command word includes the pause bit field for storing a second pause value.

7. An analog-to-digital conversion system as in claim 6, wherein said pause means inhibits said accessing means from accessing the first set of conversion command words if the first pause value is a predetermined value.

8. An analog-to-digital conversion system as in claim 7, wherein said pause means inhibits said accessing means from accessing the second set of conversion command words if the second pause value is the predetermined value.

9. An analog-to-digital conversion system as in claim 1, further comprising:
status means for indicating that said pause means is inhibiting said accessing means, said status means being coupled to said pause means.

10. An analog-to-digital conversion system as in claim 1, further comprising:
a central processing unit; and
interrupt means for providing an interrupt to said central processing unit when the pause means is inhibiting said accessing means, said interrupt means being coupled to said central processing unit and to said pause means.

11. An analog-to-digital conversion system as in claim 1, further comprising:
result storage means for storing the digital value, said result storage means being coupled to said analog-to-digital converter.

12. An analog-to-digital conversion system as in claim 1, wherein said accessing means assigns a first priority level to the first set of conversion command words, and assigns a second priority level to the second set of conversion command words.

13. An analog-to-digital conversion system as in claim 1, wherein the analog-to-digital conversion system is on an integrated circuit.

14. An analog-to-digital conversion system comprising:
a plurality of analog input terminals;
a first multi-entry digital storage circuit, wherein a first entry of said first multi-entry digital storage circuit stores a first conversion command word, and wherein a second entry of said first multi-entry digital storage circuit stores a second conversion command word, the first conversion command word having a pause control bit field;
control means for receiving the first conversion command word and for providing a first plurality of control signal values in response thereto, said control means for receiving the second conversion command word and for providing a second plurality of control signal values in response thereto, said control means being coupled to said first multi-entry digital storage circuit;
sampling means for sampling a first analog signal on a first one of said plurality of analog input terminals and for providing a first sampled value of the first analog signal in response to an at least one of the first plurality of control signal values, said sampling means for providing a second sampled value in response to an at least one of the second plurality of control signal values, said sampling means being coupled to said control means and to said plurality of analog input terminals;
an analog-to-digital converter, coupled to said sampling means, said analog-to-digital converter converting the first sampled value of the first analog signal into a first digital value, said analog-to-digital converter converting the second sampled value into a second digital value; and
trigger detection means for detecting a trigger condition, wherein if the pause control bit field has a predetermined value, said analog-to-digital converter does not convert the second sampled value into the second digital value until said trigger detection means has detected the trigger condition.

15. An analog-to-digital conversion system as in claim 14, further comprising:
a second multi-entry digital storage circuit.

16. An analog-to-digital conversion system as in claim 15, wherein a first entry of said second multi-entry digital storage circuit stores a third conversion command word, and wherein a second entry of said second multi-entry digital storage circuit stores a fourth conversion command word.

17. An analog-to-digital conversion system as in claim 15, wherein said control means comprises:
priority circuitry for selecting one of said first multi-entry digital storage circuit and said second multi-entry digital storage circuit.

18. An analog-to-digital conversion system as in claim 14, further comprising:
storing means for storing the first and second digital values, said storing means being coupled to said analog-to-digital converter.

19. An analog-to-digital conversion system as in claim 14, wherein the pause control bit field is a single pause control bit.

20. An analog-to-digital conversion system as in claim 14, wherein the second conversion command word has a second pause control bit field.

21. An analog-to-digital conversion system as in claim 14, further comprising:
a central processing unit, coupled to said first multi-entry digital storage circuit.

22. An analog-to-digital conversion system as in claim 21, further comprising:
interrupt means for selectively providing an interrupt to said central processing unit when the pause control bit field has the predetermined value, said interrupt means being coupled to said central processing unit.

23. An analog-to-digital conversion system as in claim 14, further comprising:
timer circuitry, coupled to said trigger detection means, said timer circuitry providing a trigger signal to said trigger detection means.

24. A method for operating an analog-to-digital conversion system, the analog-to-digital conversion system comprising means for accessing a first plurality of conversion command words assigned to a first queue and for accessing a second plurality of conversion command words assigned to a second queue, and an analog-to-digital converter for performing a first plurality of analog-to-digital conversions responsive to the first plurality of conversion command words and for performing a second plurality of analog-to-digital conversions responsive to the second plurality of conversion command words, the method comprising the steps of:
- accessing a first one of the first plurality of conversion command words, the first one of the first plurality of conversion command words including a first pause control value;
- performing a first one of the first plurality of analog-to-digital conversions responsive to the first one of the first plurality of conversion command words; and
- if the first pause control value has a predetermined value, performing the following steps:
  - disabling the first plurality of analog-to-digital conversions responsive to the first plurality of conversion command words, but not disabling the second plurality of analog-to-digital conversions responsive to the second plurality of conversion command words;
  - receiving a trigger signal; and
  - in response to receiving the trigger signal, enabling the first plurality of analog-to-digital conversions responsive to the first plurality of conversion command words.

25. A method as in claim 24, further comprising the step of:
- while the first plurality of analog-to-digital conversions responsive to the first plurality of conversion command words is disabled, performing a first one of the second plurality of analog-to-digital conversions responsive to a first one of the second plurality of conversion command words.

26. A method as in claim 24, wherein each conversion command word of the first and second pluralities of conversion command words includes a pause control value.

27. A method as in claim 24, wherein if the first pause control value has the predetermined value, performing the following step:
- selecting the trigger signal from a plurality of trigger signals.

* * * * *